(12) United States Patent
Sirous

(10) Patent No.: US 10,717,450 B2
(45) Date of Patent: Jul. 21, 2020

(54) PASSENGER SAFE WAGON

(71) Applicant: Saeid Sirous, Najaf abad (IR)

(72) Inventor: Saeid Sirous, Najaf abad (IR)

( * ) Notice: Subject to any disclaimer, the term of this patent is extended or adjusted under 35 U.S.C. 154(b) by 130 days.

(21) Appl. No.: 15/789,193

(22) Filed: Oct. 20, 2017

(65) Prior Publication Data

US 2019/0118837 A1 Apr. 25, 2019

(51) Int. Cl.
| | | |
|---|---|---|
| *B61D 1/02* | (2006.01) | |
| *B61D 31/00* | (2006.01) | |
| *B61D 33/00* | (2006.01) | |
| *B61D 19/02* | (2006.01) | |
| *B61D 25/00* | (2006.01) | |
| *B61D 27/00* | (2006.01) | |

(52) U.S. Cl.
CPC .............. *B61D 1/02* (2013.01); *B61D 19/023* (2013.01); *B61D 31/00* (2013.01); *B61D 33/0092* (2013.01); *B61D 25/00* (2013.01); *B61D 27/00* (2013.01)

(58) Field of Classification Search
CPC ........ B61D 1/02; B61D 19/023; B61D 31/00; B61D 33/0092; B61D 25/00; B61D 27/00; B60R 21/00; B60R 21/01; B60R 21/02; B60R 16/0233; B60R 25/016; B60R 21/207; B60R 2021/0093; B60K 28/14; B64D 25/04; B64D 25/00; B64D 13/00; B64D 11/0621; B64D 2231/025; A62C 3/07; A62C 3/08; A62C 3/10; A62C 2/00; A62C 2/06; A62C 2/04
USPC ........ 169/54, 62, 48, 49; 180/271, 274, 279, 180/280, 281, 282, 283, 284, 285, 286, 180/289, 287; 244/118.6, 118.5; 105/316, 321; 5/9.1, 424, 425
See application file for complete search history.

(56) References Cited

U.S. PATENT DOCUMENTS

| | | | | |
|---|---|---|---|---|
| 5,458,367 | A * | 10/1995 | Marts | B60R 21/12 280/728.3 |
| 5,690,355 | A * | 11/1997 | Kleinberg | B60P 3/38 105/316 |
| 5,716,026 | A * | 2/1998 | Pascasio | B64D 11/00 105/315 |
| 6,367,839 | B1 * | 4/2002 | Langhoff | B60R 22/28 280/751 |
| 6,612,606 | B1 * | 9/2003 | Bergenheim | B60R 21/06 280/728.1 |
| 2004/0250347 | A1 * | 12/2004 | Brewin | A47C 21/08 5/426 |
| 2005/0104347 | A1 * | 5/2005 | Hawthorn | B60R 21/01 280/739 |
| 2005/0173909 | A1 * | 8/2005 | Langhoff | B60R 21/02 280/749 |
| 2012/0187671 | A1 * | 7/2012 | Friedman | B60R 21/16 280/806 |

OTHER PUBLICATIONS

2018 Chrysler Pacifica Passenger-Side small overlap IIHS Crash test, Insurance Institute for Highway Safety's video on youtube. com, Published Aug. 15th, 2018 Accessible at: https://youtu.be/dnrPJ3YbzaA (Year: 2018).*

* cited by examiner

*Primary Examiner* — Justin M Jonaitis

(57) ABSTRACT

The purpose of this plan is to reduce the damages in intercity train crash cases to the passengers. Berth sleeper airbags are designed to protect the passenger's head and body while the passenger is asleep in the berth sleeper, which inflates in the event of a rollover accident.

3 Claims, 20 Drawing Sheets

Section A-A

Section B-B

Section C-C

Section D-D

Section E-E

PASSENGER SAFE WAGON

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

U.S. patent classification
244/118.6; 105/316; 105/321; 5/9.1

Bus and train transportation are regarded as one of the safest modes of public transportation. The manufacturers and operators of buses have gone to great lengths to establish and maintain this safety record. However, a fire resulting from a collision or failure of a component puts lives at risk and can have an enormous impact on operational costs as well as customer confidence.

Improving passenger and driver safety is always on the agenda. Part of the safety issues is fire safety which is a continuous process. There are always things to be learnt from experience and actual fire incidences and important learning tools at the disposal of stakeholders which can provide critical input into best practices for design, operation and human interaction. Fire safety in buses has been the focus of significant research in recent years but much improvement still remains, in particular related to fire prevention and safe egress. The sharing of information and best practices can benefit all parties but most importantly, the passenger safety.

I. Ceramic Fiber

Ceramic Fiber is produced from high purity aluminosilicate material through strictly controlled high temperature furnace melting and fiberizing process. The fiber is white and odorless, suitable for high temperature applications up to 2300° F. (1260° C.). Ceramic Fiber products include cloth, tape, rope, braid, tubing, paper, blanket, etc. Types of ceramics are:

Kaowool Blanket

Kaowool blanket is produced from kaolin, a naturally occurring alumina-silica fire clay. Kaowool, the world's most recognizable name in ceramic fiber blanket, is available in a wide variety of densities and sizes. Kaowool blanket offers excellent handle ability and high temperature stability. This allows it to meet a wide range of hot face and backup insulation applications in furnaces, kilns and other equipment requiring high temperature heat containment.

Kaowool RT Blanket

Kaowool RT Blanket is produced from a blend of high quality alumina, silica and kaolin using the spinning process. It is available in a wide variety of densities and sizes, and offers a highly cost effective alternative to Cerablanket with its 2300° F. (1260° C.) maximum temperature rating.

Cerablanket

Cerablanket is produced from exceptionally pure oxides of alumina and silica using the spinning process. The resultant quality spun fibers have been optimized for high handling strength, with on average the highest tensile strength of any Thermal Ceramics ceramic fiber blanket. Cerablanket is available in a wide variety of densities and sizes. Cerablanket offers excellent handle ability and high temperature stability which allows it to meet a wide range of hot face and back up insulation applications in furnaces, kilns and other equipment requiring high temperature heat containment.

Cerachem Blanket

Cerachem Blanket is a 2600° F. (1427° C.) maximum temperature rated refractory blanket formed from a unique, patented, spun alumina-silica-zirconia fiber. It is specially designed for applications where high fiber tensile strength, low thermal conductivity and low shrinkage are required. Cerachem Blanket is used extensively in high temperature units in the ceramic, chemical processing, and ferrous metal industries. Thermal Ceramics Cerachem refractory blankets are ideal for a wide range of hot face lining and backup insulation applications in furnaces, kilns and other high temperature equipment.

Cerachrome Blanket

Made from spun alumina-silica-chromia fiber, Cerachrome Blanket is well suited for hot face lining applications where higher temperatures are encountered, such as soaking pit covers, reheat and forging furnaces. Cerachrome Blanket with its chromia-stabilized chemistry offers improved long term shrinkage characteristics over zirconia containing blankets such as Cerachem. Cerachrome Blanket effectively fills the gap between zirconia blankets and high alumina products.

II. Fire Resistant Glass

Fire resistant glass is one of the most important safety glass. Coefficient expansion of thermal expansion of the glass is extremely low. It could resist much thermal shock caused by extreme temperature gradient across the glass between fire exposed and non-fire exposed sides. Glass becomes molten but does not break under high temperature and high temperature gradient. It remains its integrity to keep away blaze, smoke and fume. This wire free fire resistant glass performs any one, two or three of following characteristics depending on Class and Grade.

- It remains its integrity for a certain period of time. It refers to the time the glass remains intact in a fire
- It forms a strong radiation barrier that prevents fire from spreading. It refers to amount the glass prevents heat emission permeate to non-exposed side.
- It is heat insulation to prevent heat flux or high temperature at non-fire side. It refers to amount the glass restricts the temperature rise on non-fire side.

All of these are significant contribute to evacuation of fire scene, the work of fire fighters and rescuers.

Class

Fire resistant glass is classified into three categories:
- Class A fire-resistant glass is a kind of fireproof glass with fireproof integrity and fireproof heat insulation.
- Class B fire-resistant glass is a kind of fireproof glass with fireproof integrity and heat emission intensity.
- Class C fire-resistant glass is a kind of fireproof glass with fireproof integrity.

Grade

The three classes of fire-resistant glasses are further classified into Grade I, Grade II, Grade III and Grade IV according to various levels of protection which is measured in terms of Integrity, Radiation and Insulation. The Table interpreting Class Vs Grade Vs Time is just for reference. Glass resists more than 90 min (could be as high as 180 min.), is classified into higher levels. There are also Classes E and EI which perform much better and are more safety for fire protection.

| Class | Grade I | Grade II | Grade III | Grade IV |
|---|---|---|---|---|
| A | 90 min. | 60 min. | 45 min. | 30 min. |
| B | 90 min. | 60 min. | 45 min. | 30 min. |
| C | 90 min. | 60 min. | 45 min. | 30 min. |

Glass Configuration:
1. Monolithic Fire Resistant Glass

Monolithic glass is single pane. This fire protective glass blocks flames, fumes and smoke but not heat radiation. Its advantages are:

- As it is not wired or laminated, it stays clear at all times during fire accident so that evacuation and putting out fire could be carried out properly. Clear fire resistant glass offer transparent alternative to solid brick walls.
- It is thermal shock proof and resists to cold, heat, solar irradiation and humidity.
- This high strengthened fire resistant glass is 3 to 5 times stronger than thermal temper glass.
- Various glass thickness of monolithic fire resistant glass is available.
- Monolithic fire resistant glass is light. Framework is cheaper. Mounting and installation is easier at lower cost.
- It is easily upgraded to several types of fire resistant glass such as reflective coated fire resistance glass, insulated fire resistant glass, laminated fire resistant glass and energy save fire resistant glass, etc.

There are several types of monolithic fire rated glazing reaching different classes and grades of fire resistance.

2. Chemically Strengthened Glass

Soda lime glass is always chemically strengthened to improve its thermal stability and internal strength. Then glass is thermally tempered by conventional tempering furnace by air quenching to it turn into Class C monolithic fire resistant glass. Xinology FR series fire resistant production system is used to carry out this process to produce Class C fire resistant glass.

3. Metallic Coated Glass

Glass could be metallic coated on both sides to reflect away heat and minimize the possibility of thermal shock. Monolithic fire resistant glass performs consistent regardless of fire attack direction.

4. Borosilicate Glass

Borosilicate glass is excellent in heat proof. It has also very low coefficient of thermal expansion to resist thermal shock. Borosilicate glass is generally fully thermal tempered upgraded to fire resistant glass.

5. Glass Ceramic

It is a special composition of glass and ceramic with excellent thermal shock and heat insulation.

III. Fire-Smoke Protection Curtain

Curtain systems are a modern alternative to conventional systems such as fire protection doors, gates and windows. With a curtain system, unreinforced openings will remain entirely useable and perfectly secured. Curtain systems can be fully integrated in the existing building concept. Due to the compact layout of the system, the fields of application are almost limitless.

The intuitive technology, the high-quality materials and the reliable construction allow an easy installation and low-maintenance operation.

Most of the time, fire smoke is a much more dangerous hazard than the fire itself. Smoke can spread quickly and silently within a building, transporting heat and therefore supporting the expansion of the fire. Just a few breaths could lead to deadly intoxication. Smoke curtains can effectively counteract the spreading of fire smoke and therefore lives can be saved.

A smoke curtain is a much better choice in such situations. In general cases, the system is rolled up and enables the unimpeded passing of the passage. The curtain only drops in case of an emergency and builds an enclosed space according to the required security targets. Usability and fire protection are perfectly combined. With a two-stage drop, it is possible to pass the curtain system before it is totally closed.

Benefits

- No obstruction of passages
- Compact and lightweight layout
- Seamless integration in the building design
- Easy installation and low-maintenance operation Modern fire protection concepts demand high standards from buildings and security systems. Owing to their flexibility and ability to easily combine fire protection technology and architectural design, curtain systems will be increasingly used.

Curtain systems can be configured for various applications. They can be used to actively control occurring combustion gases to create a steady space enclosure or establish an isolating heat barrier.

Fields of Application

- Airports, subway stations
- Community buildings, schools
- Industrial buildings, warehouses
- Universities and laboratories IV. Fire Resistant Cable In all fire disasters, fire smoke, heat and toxic fumes are the main obstacles to safe evacuation of a building or area. A major contribution towards overcoming these hazards is the use of fire resistant and non-halogenated cables. These cables provided the following features:

- Fire resistance
- Long-term circuit integrity in a fire
- Low smoke and toxic gas emissions
- Flame retardant properties
- Zero halogen gases
- Ease and low cost of installation Fire Resistant cables are used, where required by local fire codes, in the wiring of:

- Fire resistant safety circuits
- Public address and emergency voice communication system in high-rise buildings
- Control and instrumentation services in industrial, commercial and residential complexes
- High-temperature installation conditions Fire Resistant Cable have been developed to maintain circuit integrity in a fire and to ensure maximum safe evacuation of personnel with no detrimental effects like toxic gases or smoke. The Fire-Resistant cables are constructed in the following typical format:

- Stranded Annealed Copper Conductor
- Mica Tape Fire Resisting Barrier
- XLEVA-MI/XLPEIEPR/LSOH/PE/PVC as Primary Insulation Material.
- Flame Retardant LSOH, PVC as Bedding or Sheathing Material.

Fire Resistant cable may be single-core or multi-core constructions. The cable may be unarmoured, armoured, braided, with or without metallic screened. The Fire resistant cable may categorized by a letter symbol (e.g. A) or series of symbols (e.g. CWZ) in according to the requirements for fire resistance characteristics which they meet, the test temperature selected and the duration of the test for resistance to fire alone in according to BS 6387 as below:

| Requirement | Symbol |
| --- | --- |
| (I) Resistance to fire alone | |
| 650° C. for 3 hours | A |
| 750° C. for 3 hours | B |
| 950° C. for 3 hours | C |
| 950° C. for 20 minutes (short duration) | S |
| (2) Resistance to fire with water | W |
| (3) Resistance to fire with mechanical shock | |
| 650° C. | X |
| 750° C. | Y |
| 950° C. | Z |

BRIEF SUMMARY OF THE INVENTION

The purpose of this plan is to reduce the damages in intercity train crash cases to the passengers. In the next phase, if the train catches fire with the increase in the incident time of smoke and fire entering to the train, the passenger is required to react appropriately. The coupe and the corridor are designed to prevent the fuel, fire, heat and wear from penetrating into the coupe so passengers can have plenty of time to get out of the train. In addition to sound proof its walls are heat and fire proof.

DETAILED DESCRIPTION OF THE INVENTION

I. Invention Objective

The target is to reduce the damages in intercity vehicles crash cases to the passengers (train and bus), at the first phase. In the next phase, if the vehicle catches fire, with the increase in the incident time of smoke and fire spreading to the wagon, the passenger has plenty of time to react appropriately.

II. Description of Drawings and Parts

Figure 1:
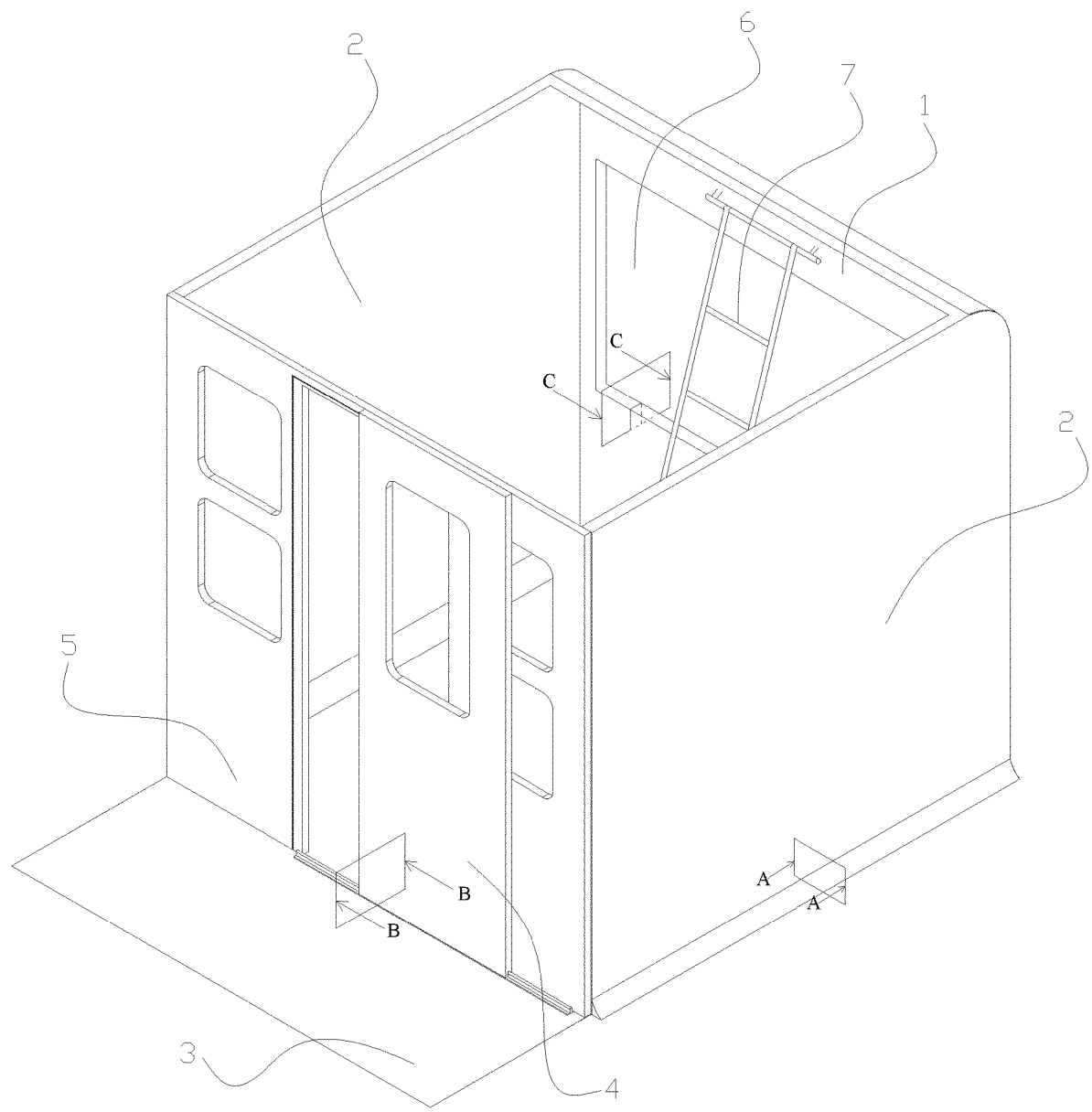
FIG. 1: General view of the coupe.
Figure 2:
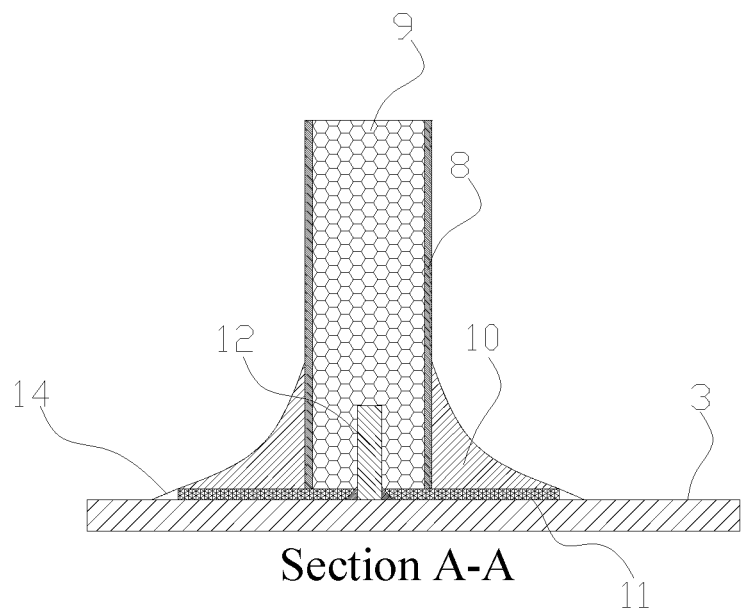
FIG. 2: Detail of a sample of top & bottom of wall Joints (Section A-A in FIG. 1).
Figure 7:
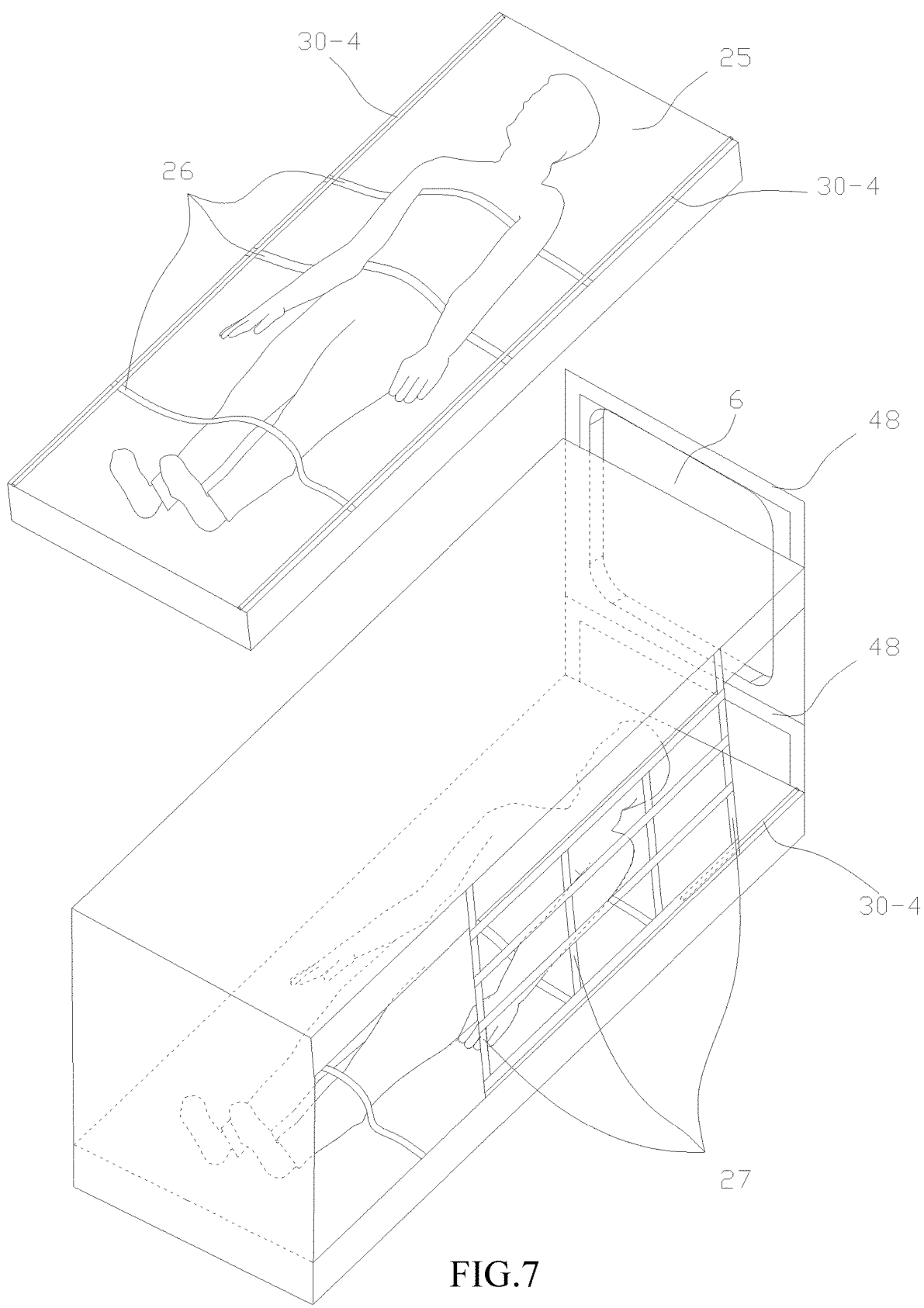
FIG. 7: General arrangement for berth sleeper.
Figure 8:
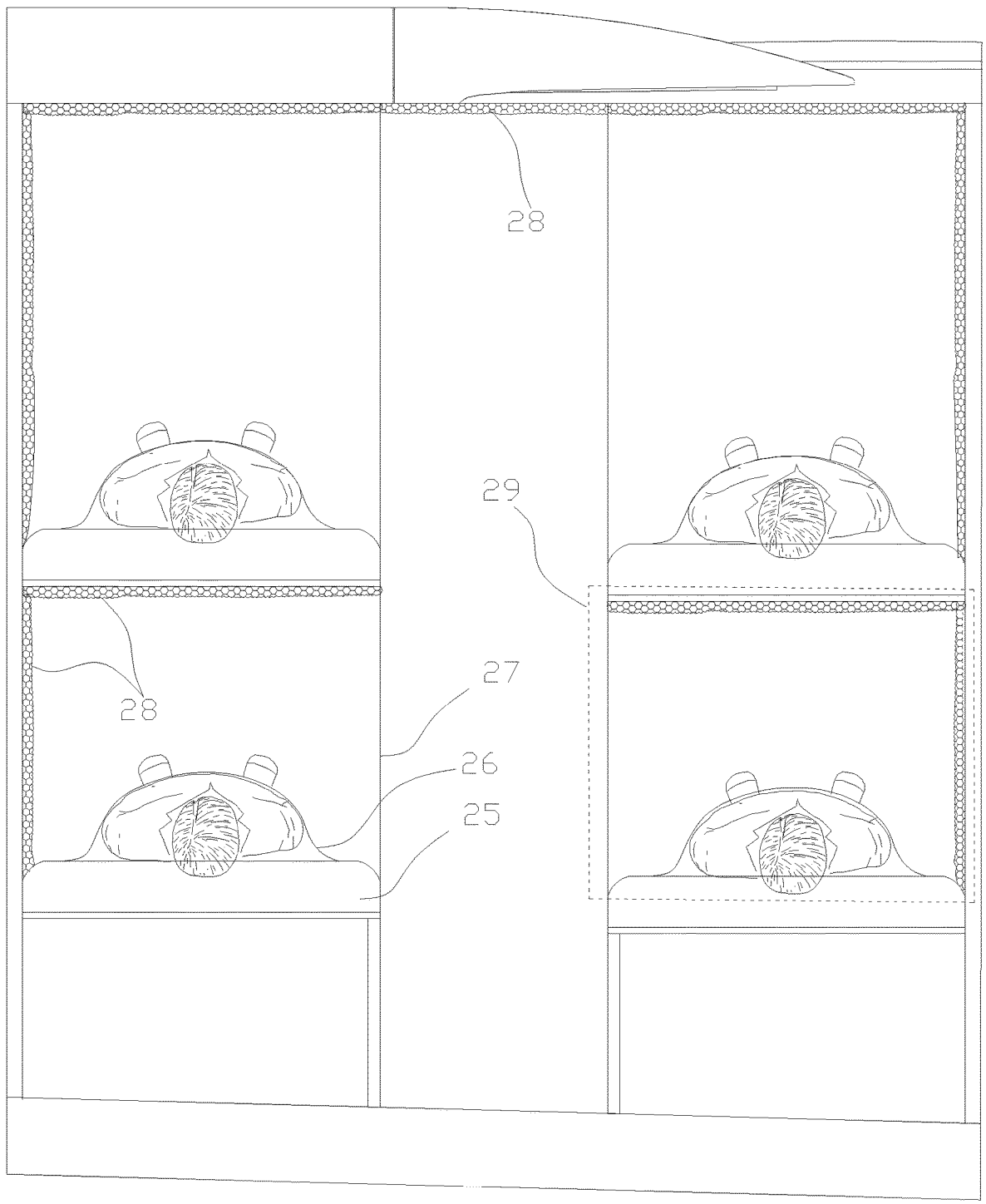
FIG. 8: Section view of a coupe with berth sleeper.
Figure 9:
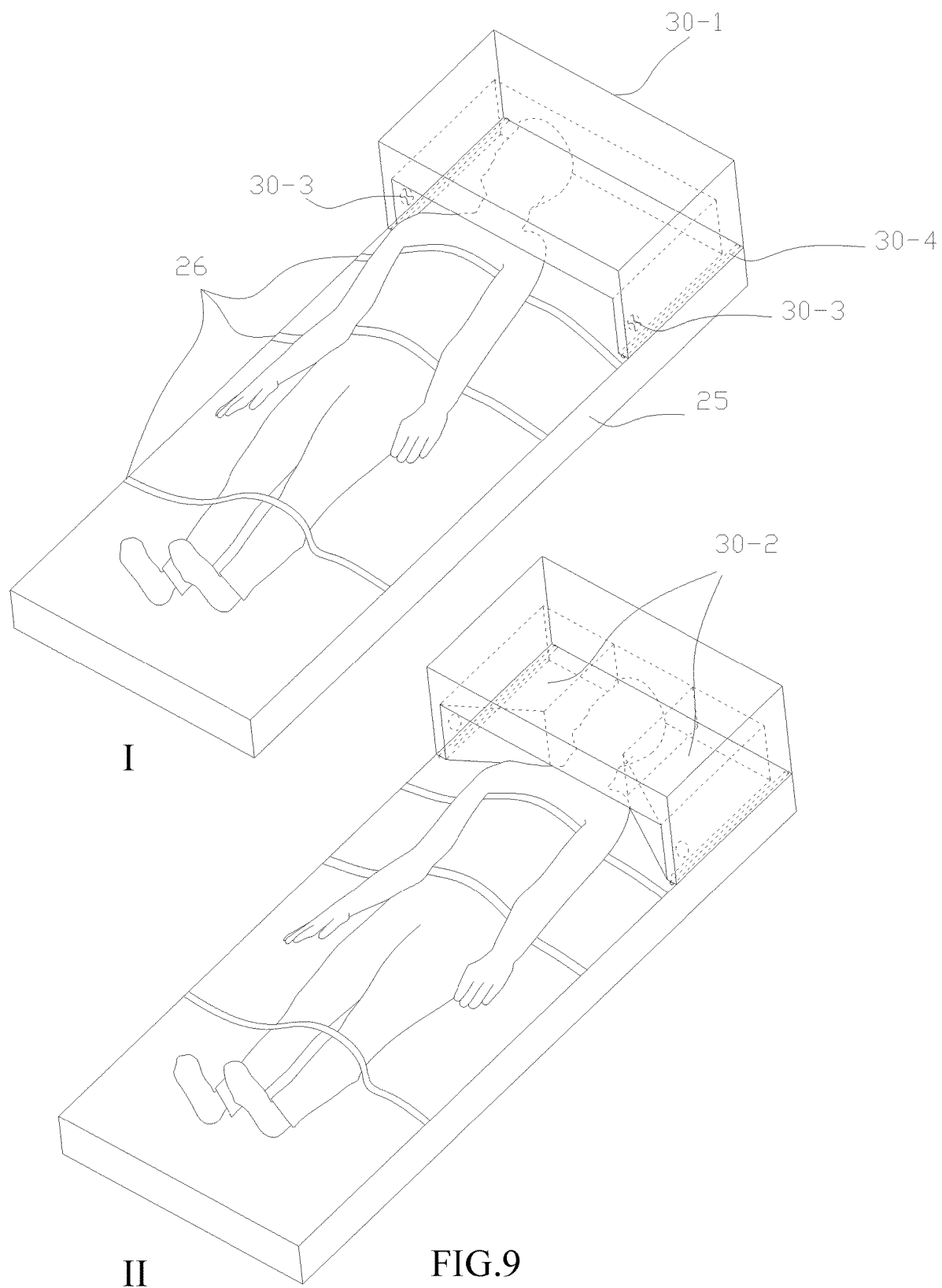
FIG. 9: Method of work of the berth sleeper airbag (covers head of passenger).
Figure 12:
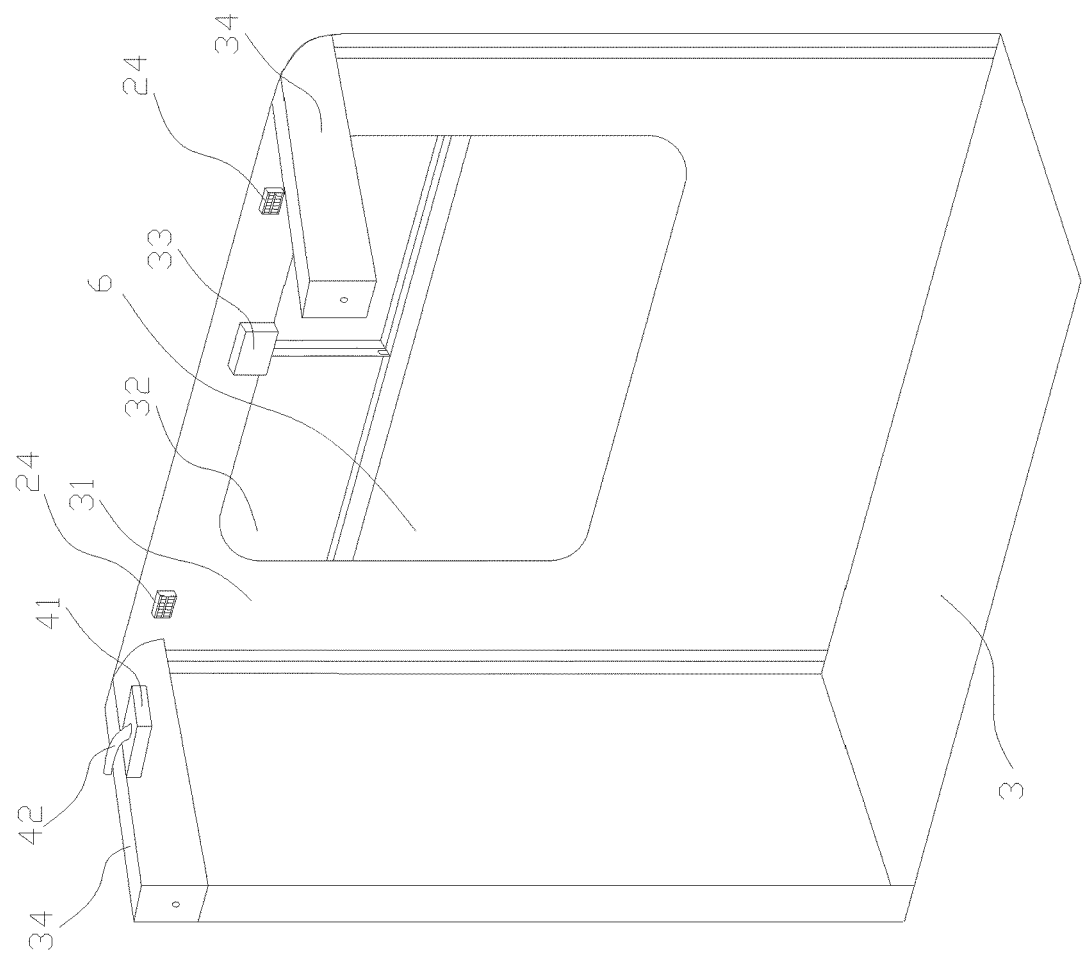
FIG. 12: General arrangement of gangway.
Figure 12:
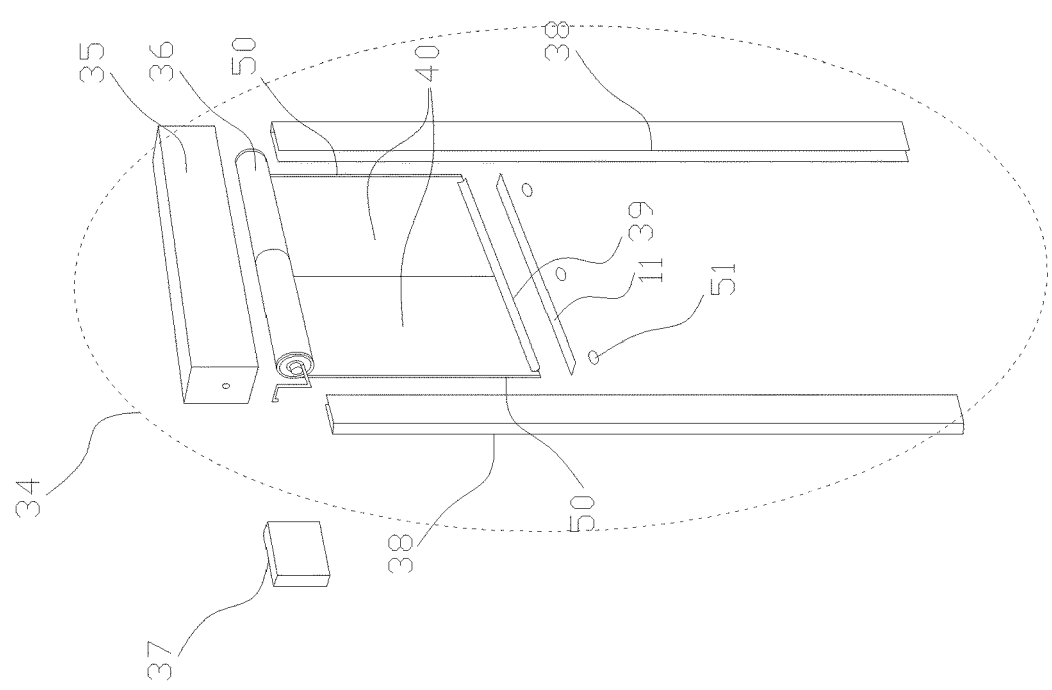
Figure 13:
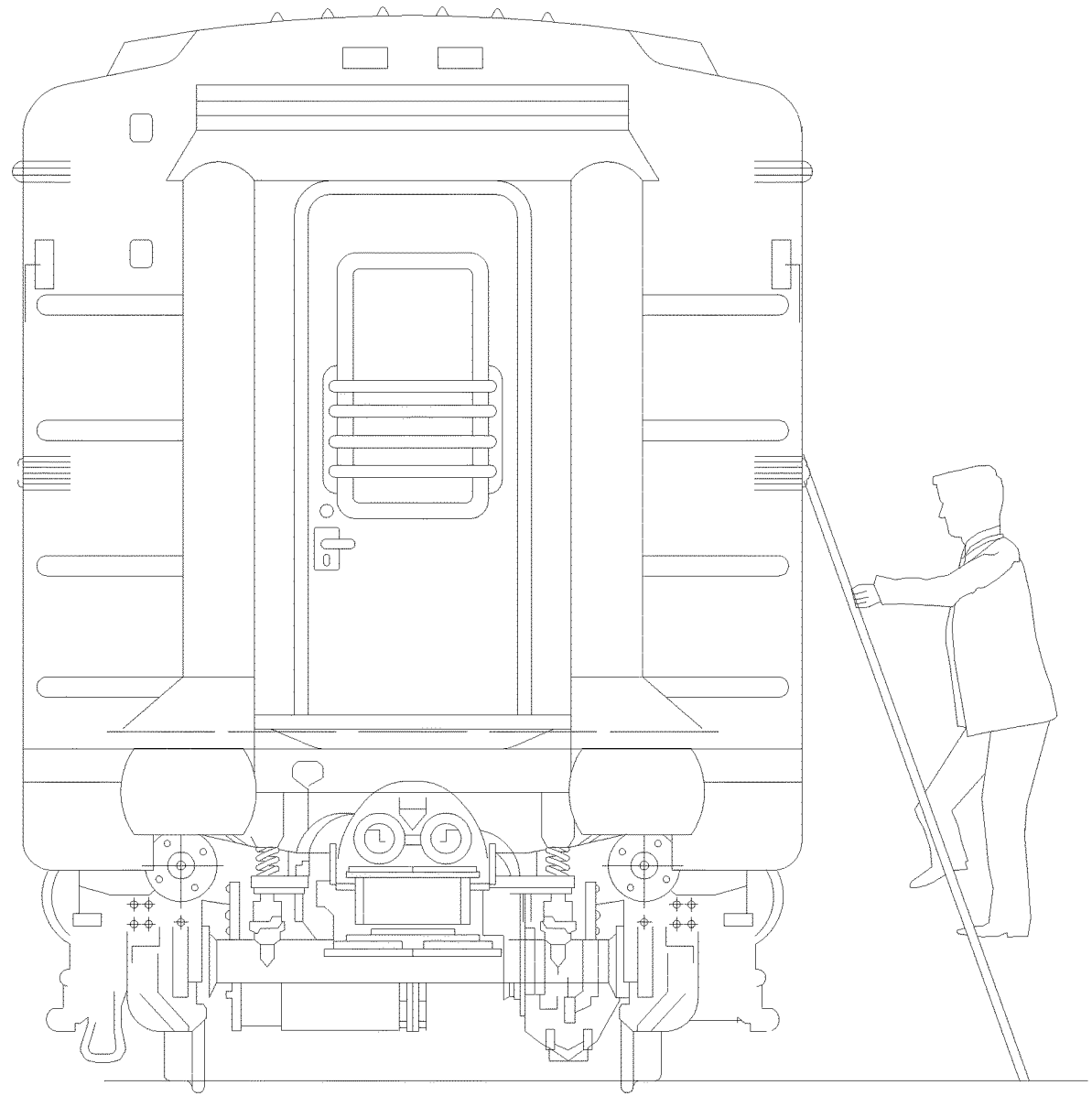
FIG. 13: The method of getting off the wagon by a ladder.

FIG. 1: General view of the coupe. This figure is composed of:
1) Wall of the wagon (coupe side)
2) Side wall of the coupe
3) Bottom of wagon
4) Sliding door of the coupe
5) Wall of the coupe (gangway side)
6) Fire resistant glass
7) Ladder
FIG. 2: Detail of a sample of top & bottom of wall Joints (Section A-A in FIG. 1). This figure is composed of:
3) Bottom of wagon
8) High temperature resistant sheet (metal sheet)
9) High temperature resistant materials (Ceramic fiber)
10) Heat temperature resistant holder
11) High temperature sealant tape
12) Fuel dam (welded to Bottom of wagon)
14) Fire and Fuel Barrier Tape
FIG. 3: Section view of sliding door (Section B-B in FIG. 1). This figure is composed of:
3) Bottom of wagon
8) High temperature resistant sheet (metal sheet)
9) High temperature resistant materials (Ceramic fiber)
15) Wheel of the sliding door
16) Pin of the wheel
17) Flexible intumescent tape
18) Rail of the sliding door (Fixed to Bottom of wagon)
FIG. 4: Section view of a sample of wall to glass seal joint (Section C-C in FIG. 1). This figure is composed of:
6) Fire resistant glass
8) High temperature resistant sheet (metal sheet)
9) High temperature resistant materials (Ceramic fiber)
19) Intumescent fire glass seals
FIG. 5: Detail of a wall with metal sheet curtain. This figure is composed of:
6) Fire resistant glass
8) High temperature resistant sheet (metal sheet)
9) High temperature resistant materials (Ceramic fiber)
19) Intumescent fire glass seals
20) Sliding metal sheet
21) Guide rail 22) Heat insulation handles FIG. 6: Detail of a wall with roller curtain. This figure is composed of:
6) Fire resistant glass
8) High temperature resistant sheet (metal sheet)
9) High temperature resistant materials (Ceramic fiber)
19) Intumescent fire glass seals
21) Guide rail
22) Heat insulation handles
23) Box
40) Fire smoke curtain FIG. 7: General arrangement for berth sleeper. This figure is composed of:
25) Berth sleeper
26) Seat belt
27) Safety belt
48) Airbag location (embedded on the wall)
30-4) Airbag guide rails
6) Fire resistant glass FIG. 8: Section view of a coupe with berth sleeper. This figure is composed of:
25) Berth sleeper
26) Seat belt
27) Safety belt
28) Soft cover to protect the passenger
29) Passenger compartment FIG. 9: Method of work of the berth sleeper airbag (covers head of passenger). This figure is composed of:
25) Berth sleeper
26) Seat belt
30-1) First stage airbag
30-2) Second stage airbags
30-3) Rupture disc
30-4) Airbag guide rails FIG. 10: Method of work of the berth sleeper airbag for passenger sleep in soldier, freefaller and starfish position (airbag covers all body of passenger). This figure is composed of:
25) Berth sleeper
26) Seat belt
30-1) First stage airbag
30-2) Second stage airbags
30-3) Rupture disc
30-5) Gas flow path
46) Passenger's weight
47) Reaction force applied from airbags to passenger FIG. 11: Method of work of the berth sleeper airbag for passenger sleep in foetus, log and yearner position (airbag covers all body of passenger). This figure is composed of:
25) Berth sleeper
26) Seat belt
46) Passenger's weight
47) Reaction force applied from airbags to passenger FIG. 12: General arrangement of gangway. This figure is composed of:
6) Fire resistant glass
31) Wall of the wagon (gangway side)
32) Sliding window with fire resistant glass
33) Sliding window opener electric motor
34) Fire-smoke curtain device
35) Head box
36) Winding shaft with motor unit
37) Control unit
38) Side guides
39) Bottom bar
11) High temperature sealant tape attached to bottom bar
40) Multi-piece fire smoke curtain
41) Roof hatch
42) Air exhaust pipe
50) Spring steel strip attached to fire smoke curtain
51) Magnet
24) Fire-smoke detector FIG. 13: The method of getting off the wagon by ladder.

Figure 14:
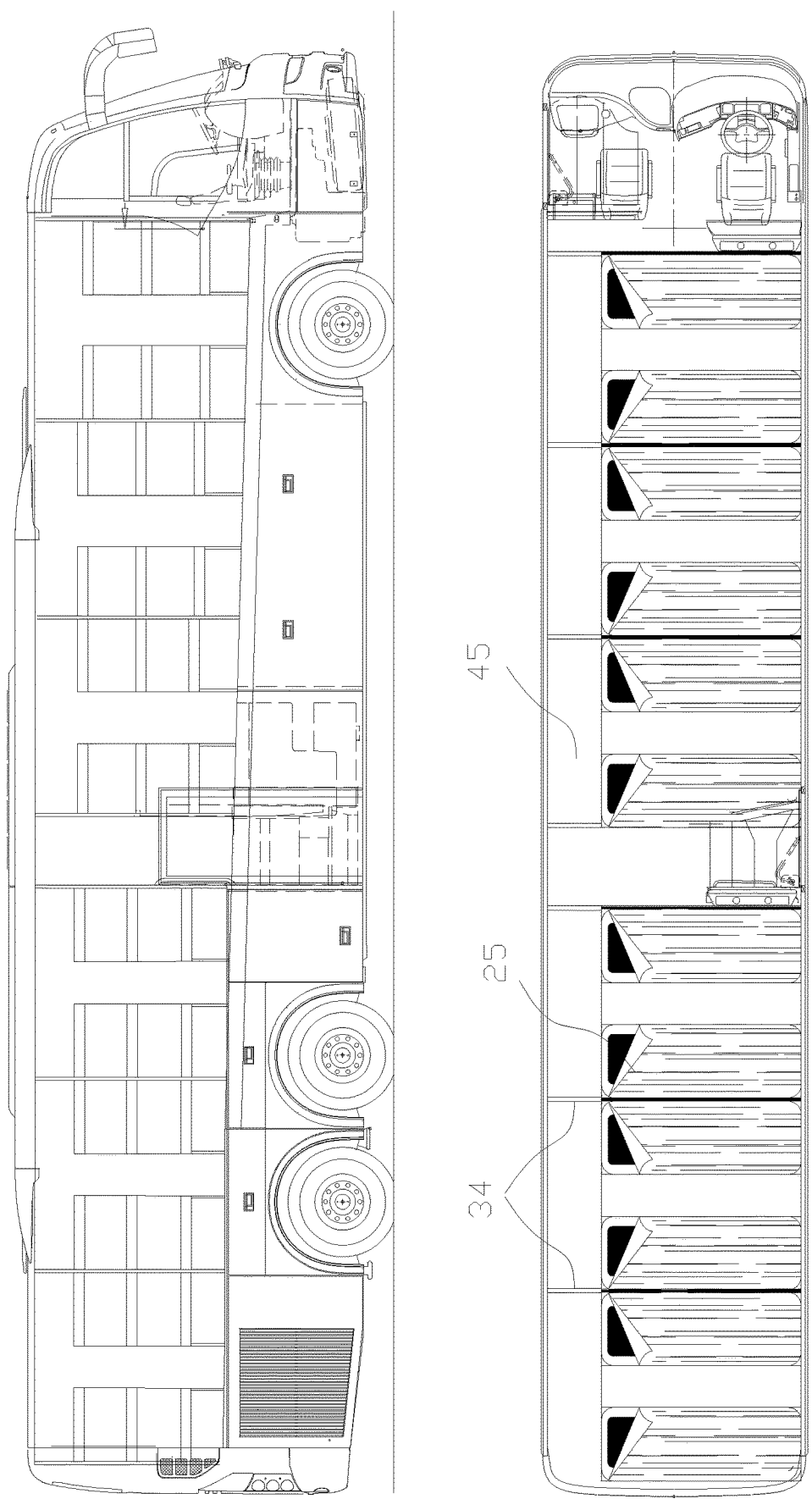
FIG. 14: General arrangement for wagon with berth sleeper.
Figure 17:
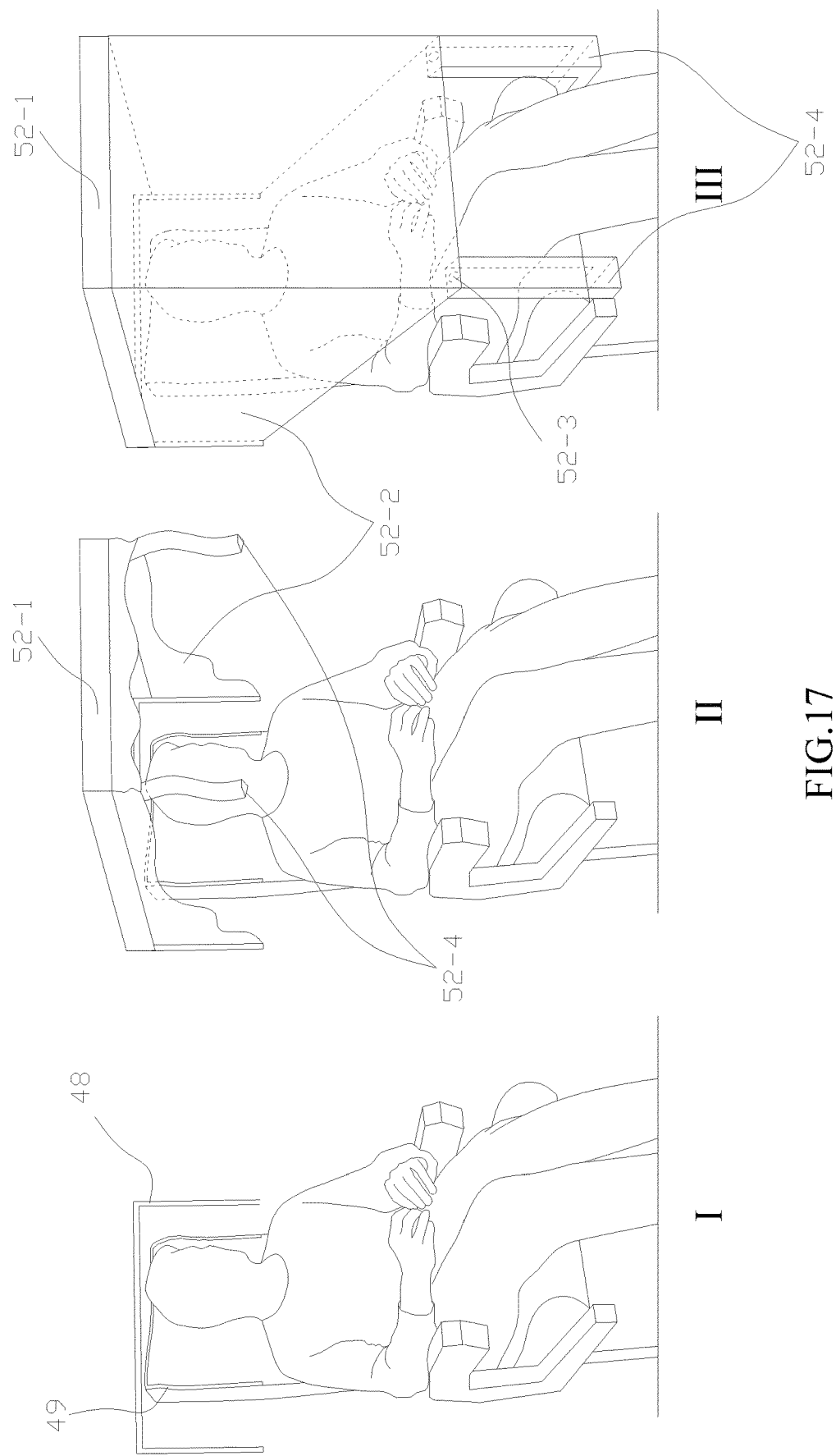
FIG. 17: Method of work of the seat airbag embedded on the side wall and passenger seated on the seat (cover the entire seat back).
Figure 18:
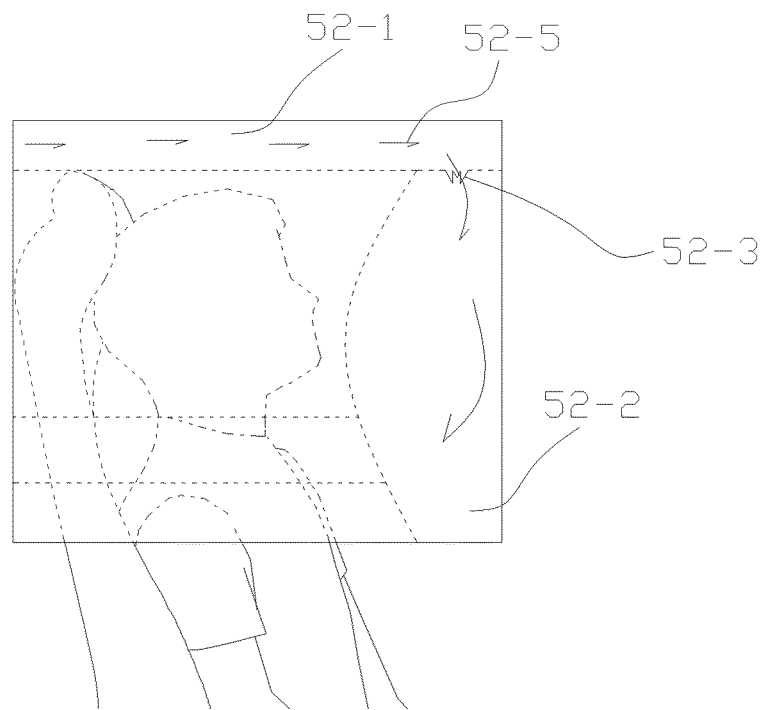
FIG. 18: Method of work of the seat airbag embedded on the side wall and passenger seated on the seat in front and side view (cover head of passenger).
Figure 18:
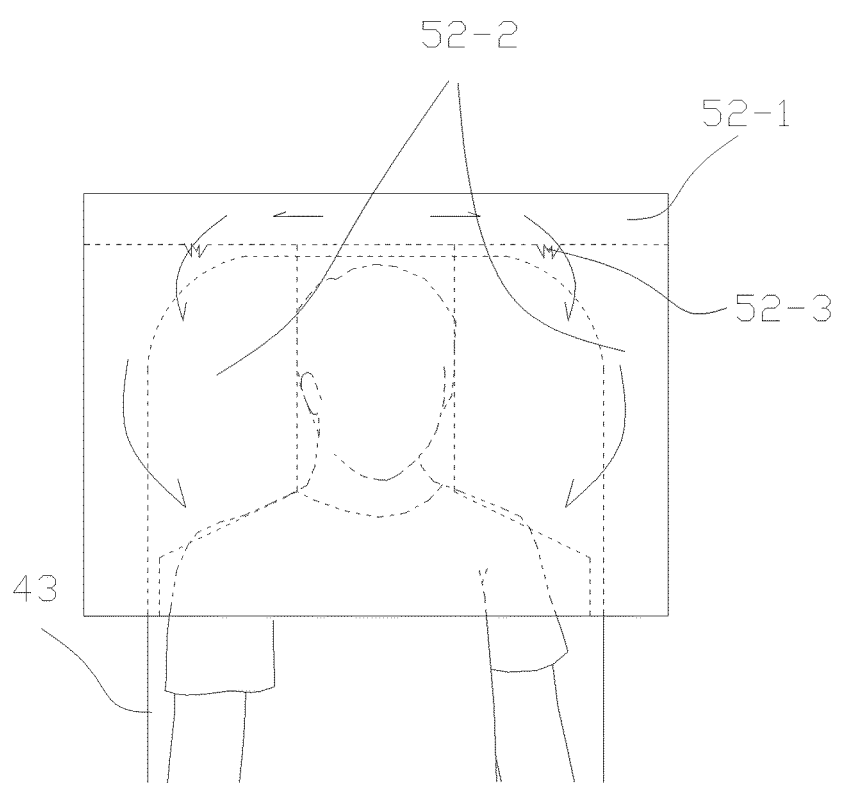

FIG. 14: General arrangement for wagon with berth sleeper. This figure is composed of:
25) Berth sleeper
to) Gangway
34) Fire-smoke curtain device FIG. 15: General arrangement for wagon with seat. This figure is composed of:
to) Gangway
34) Fire-smoke curtain device
43) Seat FIG. 16: Section view of a coupe with seat. This figure is composed of:
26) Seat belt
43) Seat
44) Seat slider rail
53) Bus luggage rack FIG. 17: Method of work of the seat airbag embedded on the side wall and passenger seated on the seat (covers the entire seat back). This figure is composed of:
48) Airbag location (embedded on the side wall)
49) Airbag location (embedded on the seat back)
52-1) First step of seat airbag
52-2) Second step of seat airbag
52-3) Rupture disc
52-4) Locker airbag FIG. 18: Method of work of the seat airbag embedded on the side wall and passenger seated on the seat in front and side view (covers head of passenger). This figure is composed of:
43) Seat
52-1) First step of seat airbag
52-2) Second step of seat airbag
52-3) Rupture disc
52-5) Gas flow path FIG. 19: Method of work of the seat airbag embedded on the luggage rack and passenger seated on the seat (covers the entire seat back). This figure is composed of:
52-1) First step of seat airbag
53) Bus luggage rack
54) Airbag location (embedded on the luggage rack)
55) Rubber band FIG. 20: Method of work of the seat airbag embedded on the luggage rack and passenger seated on the seat in side view. This figure is composed of:
52-1) First step of seat airbag
52-2) Second step of seat airbag
53) Bus luggage rack
56) Forces applied to abdomen of passenger to keep the passenger in place FIG. 21: Method of work of the berth sleeper airbag (covers head of passenger). This figure is composed of:
30-5) Bag
25) Berth sleeper
26) Seat belt
30-1) First stage airbag
30-2) Second stage airbags
30-3) Rupture disc
30-4) Airbag guide rails FIG. 22: Method of work of the berth sleeper airbag for passenger sleep in foetus, log and yearner position (airbag covers all body of passenger). This figure is composed of:

30-5) Bag
25) Berth sleeper
26) Seat belt
46) Passenger's weight
47) Reaction force applied from airbags to passenger

III. Description of the Invention

Figure 3:
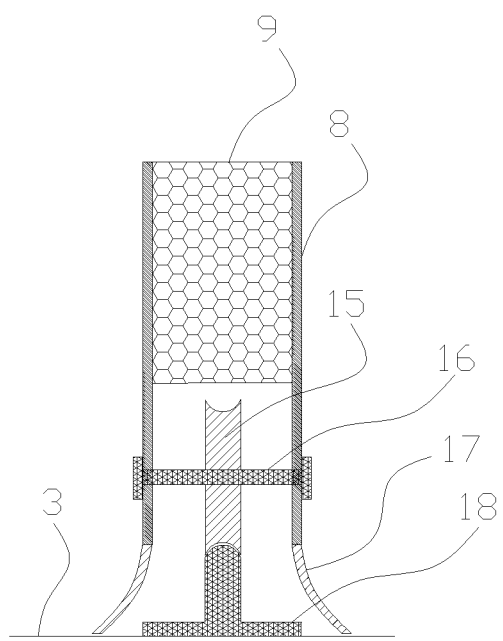
FIG. 3: Section view of sliding door (Section B-B in FIG. 1).
Figure 4:
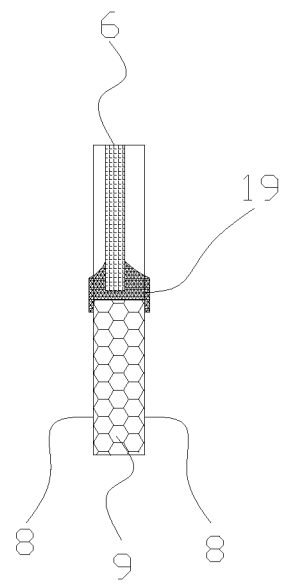
FIG. 4: Section view of a sample of wall to glass seal joint (Section C-C in FIG. 1).
Figure 5:
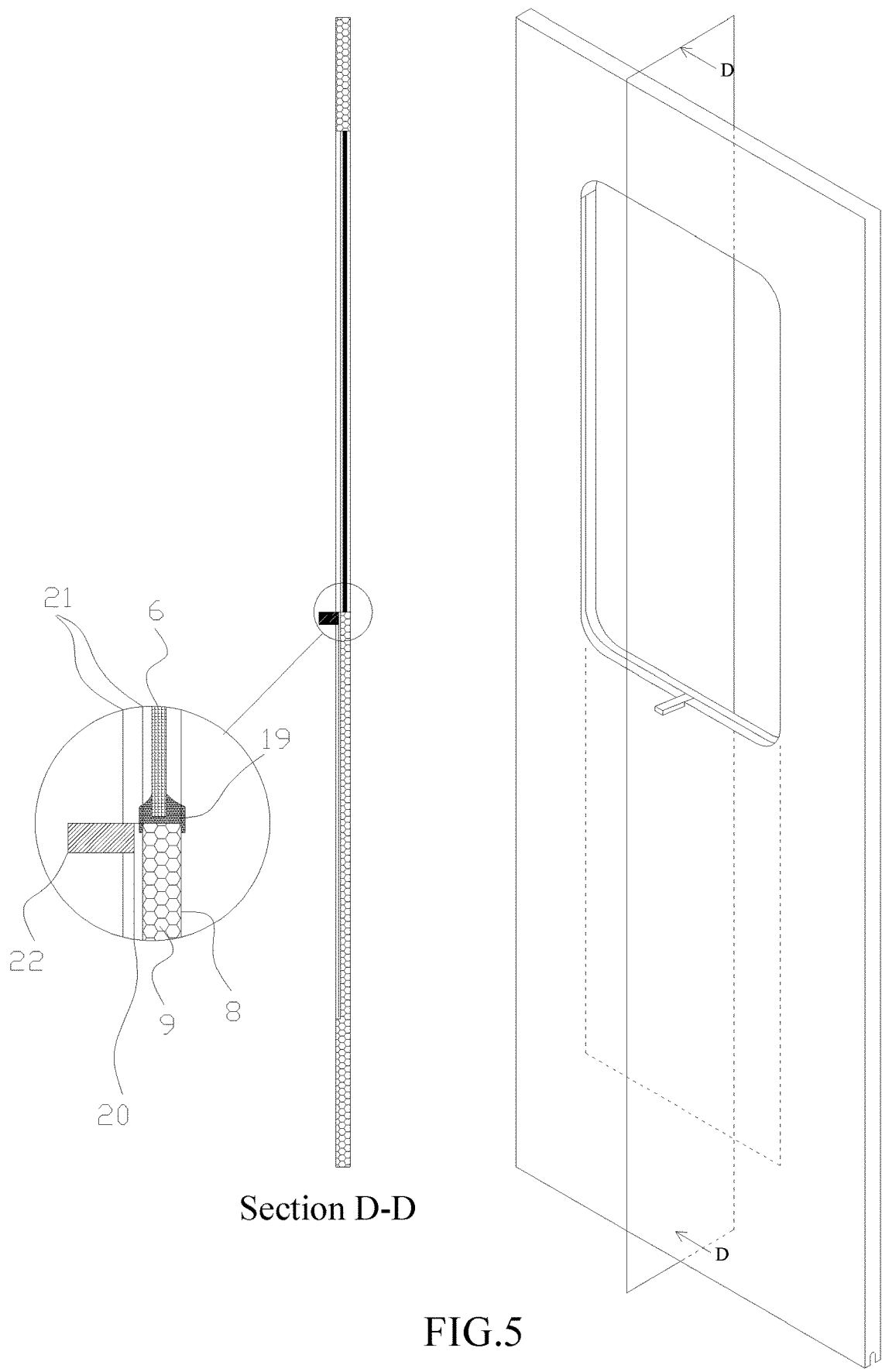
FIG. 5: Detail of a wall with metal sheet curtain.
Figure 6:
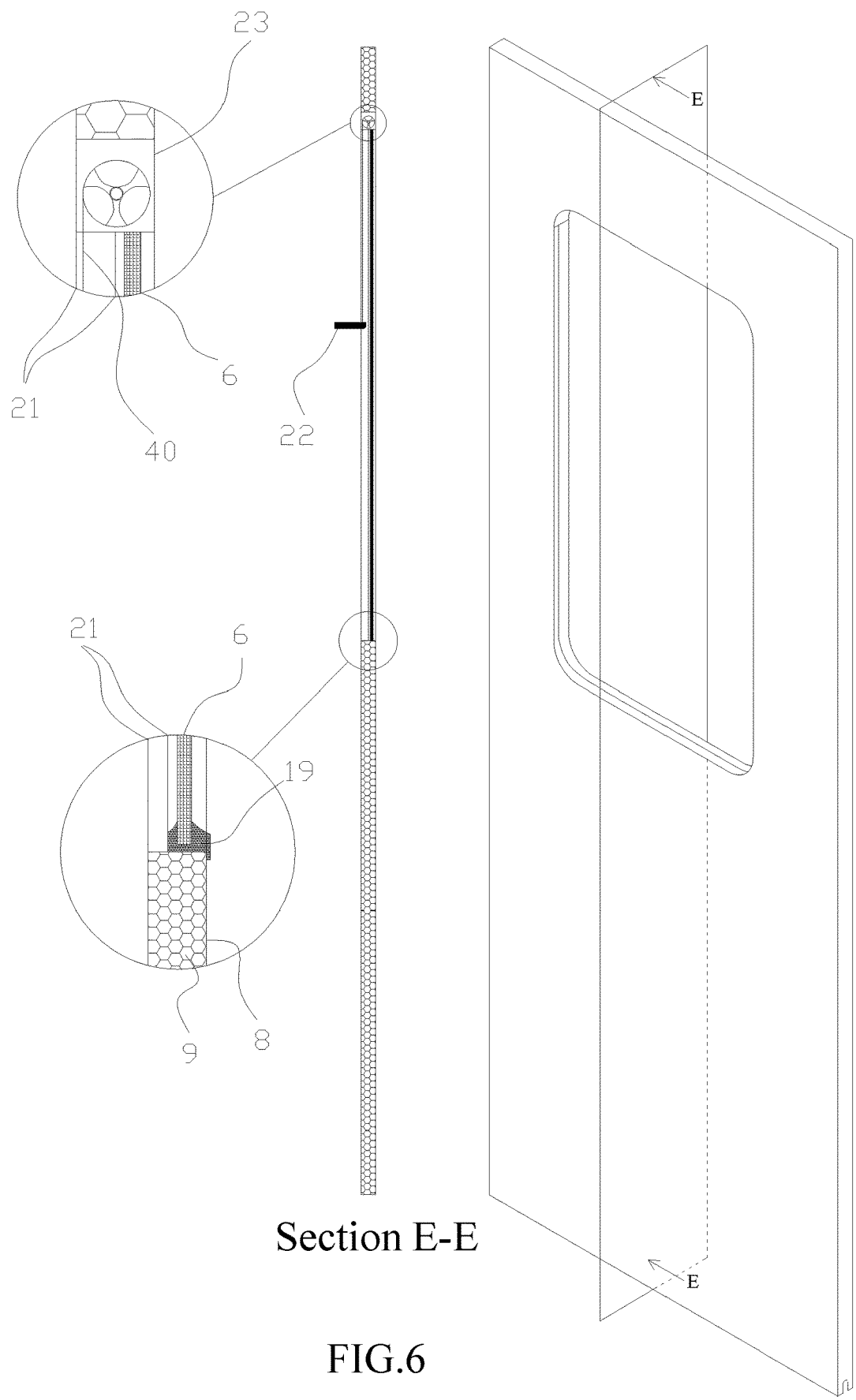
FIG. 6: Detail of a wall with roller curtain.
Figure 10:
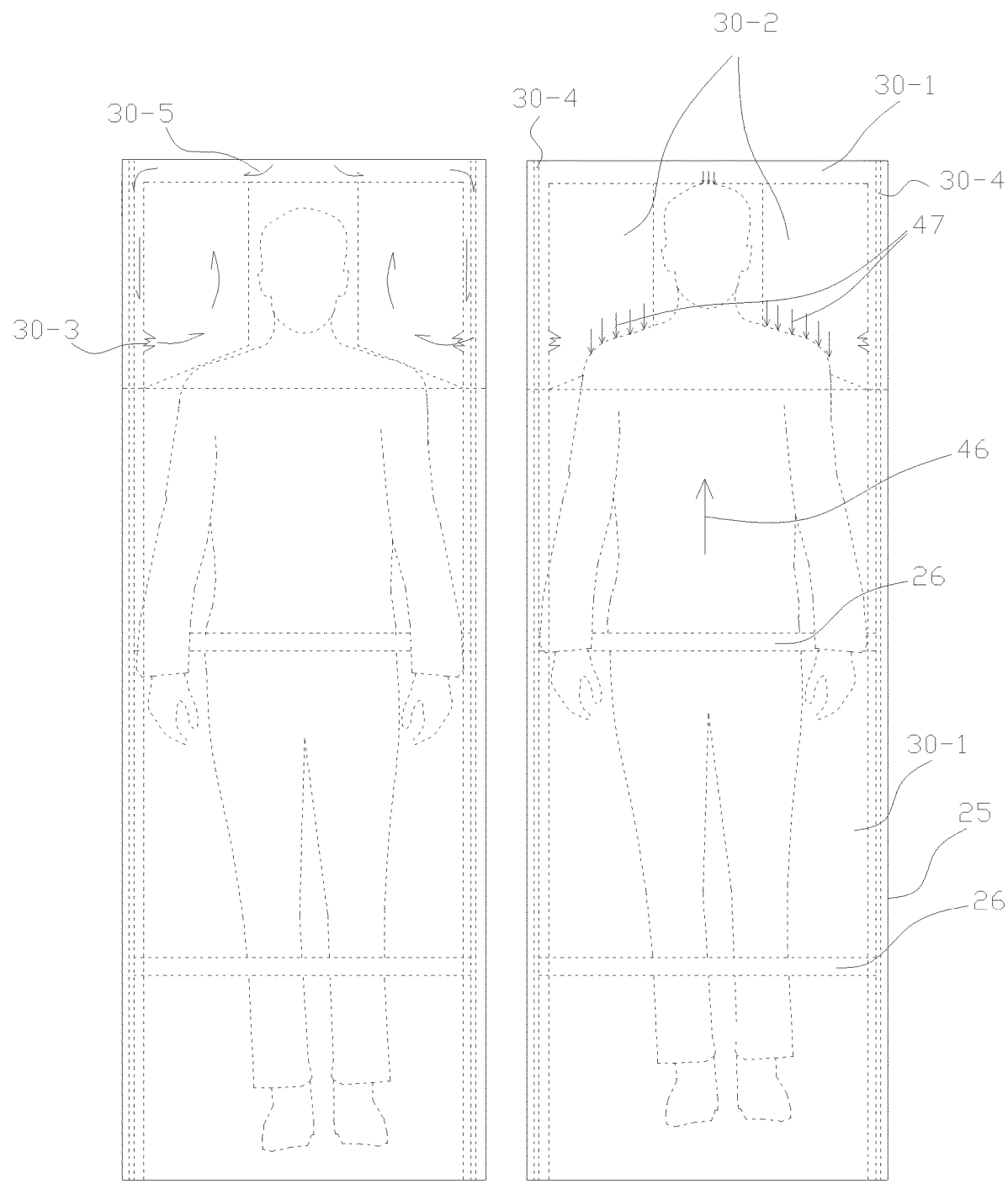
FIG. 10: Method of work of the berth sleeper airbag for passenger sleep in soldier, freefaller and starfish position (covers all body of passenger).
Figure 11:
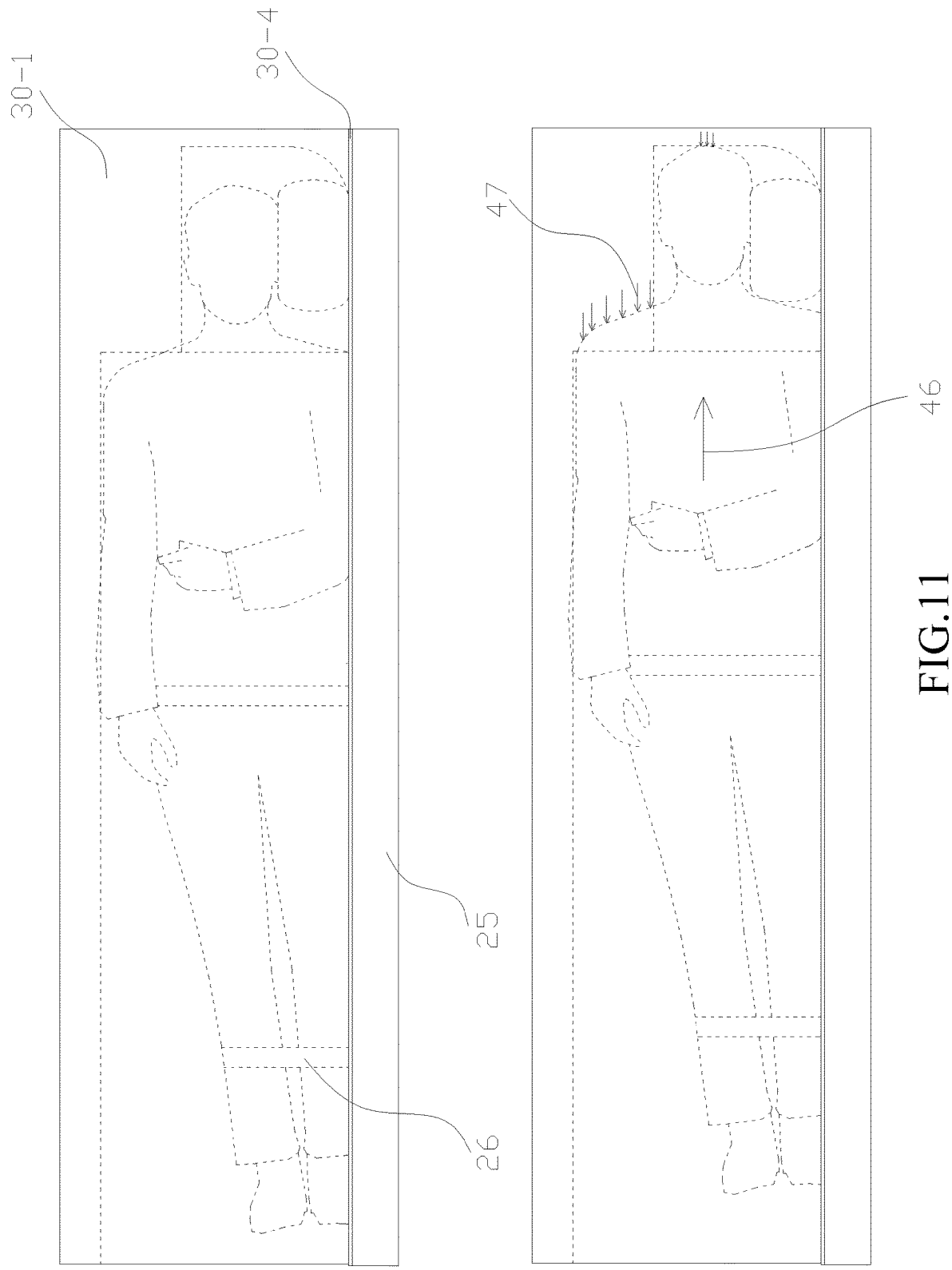
FIG. 11: Method of work of the berth sleeper airbag for passenger sleep in foetus, log and yearner position (covers all body of passenger).
Figure 15:
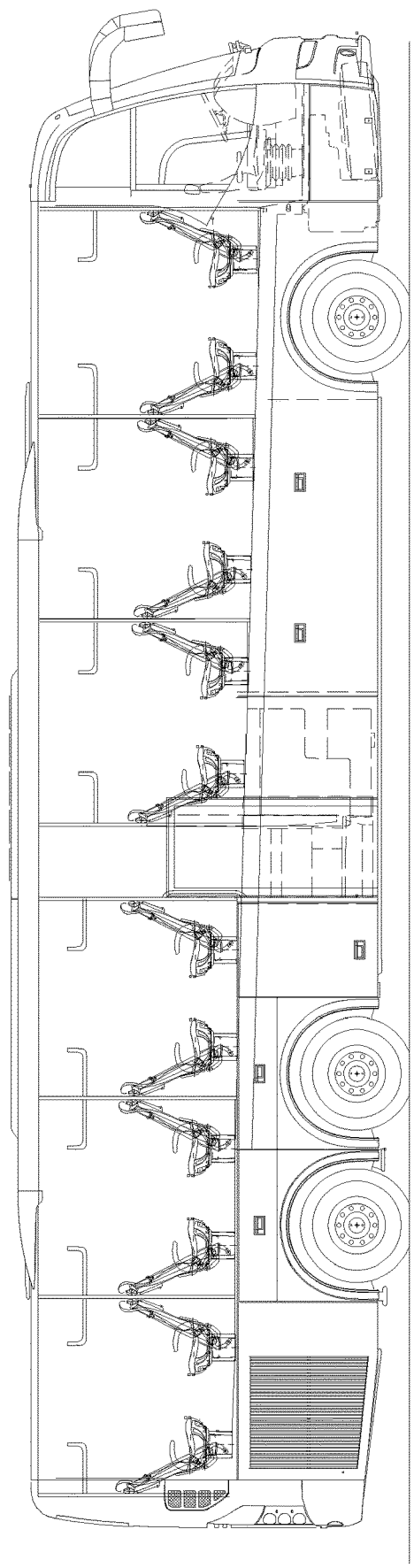
FIG. 15: General arrangement for wagon with seat.
Figure 15:
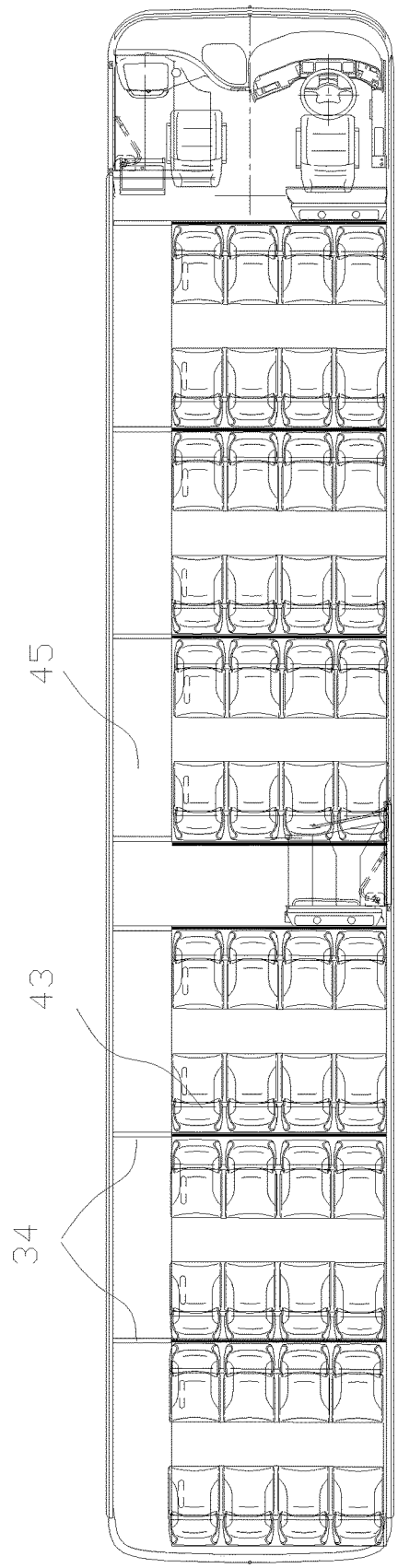
Figure 16:
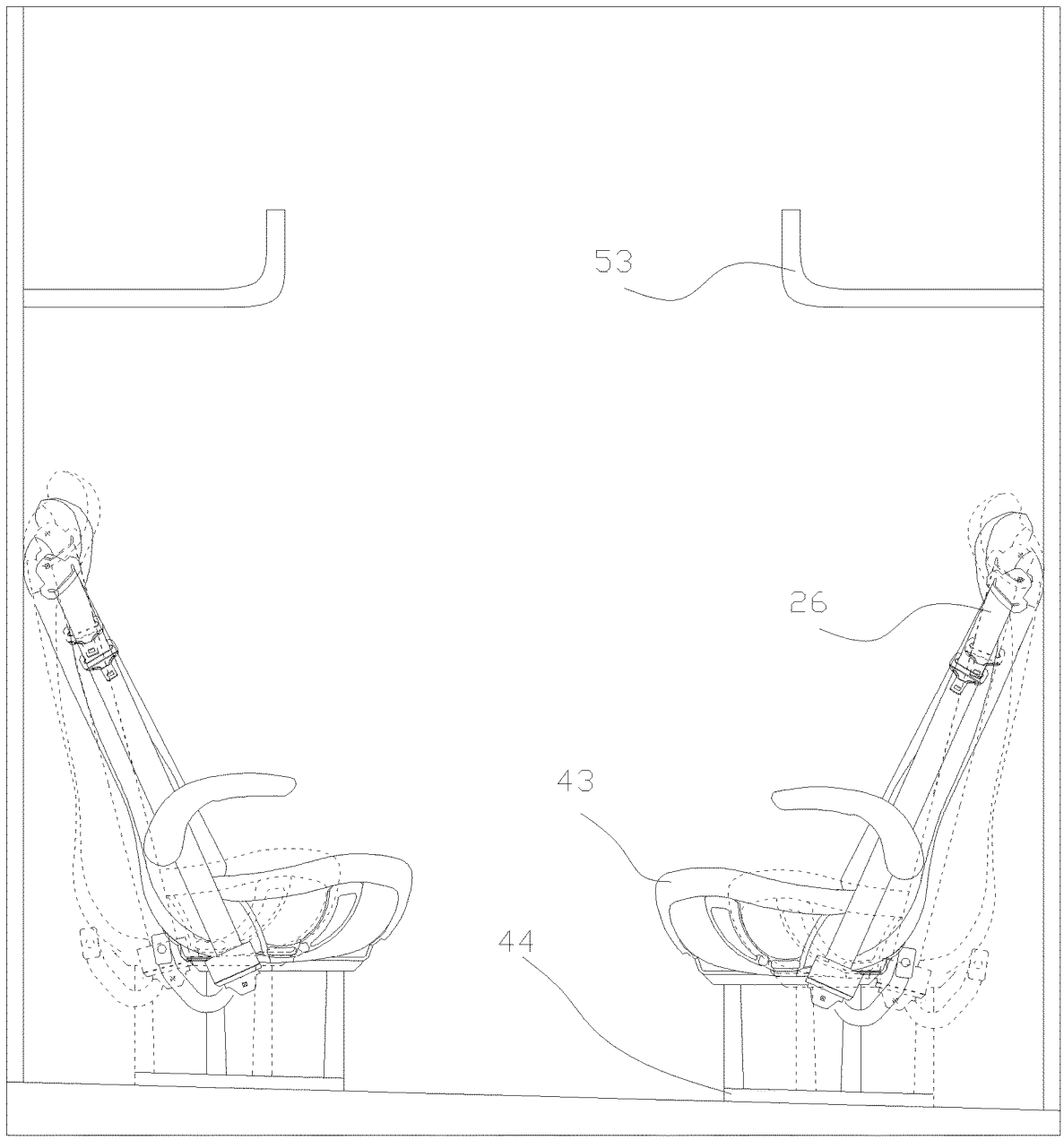
FIG. 16: Section view of a coupe with seat.
Figure 21:
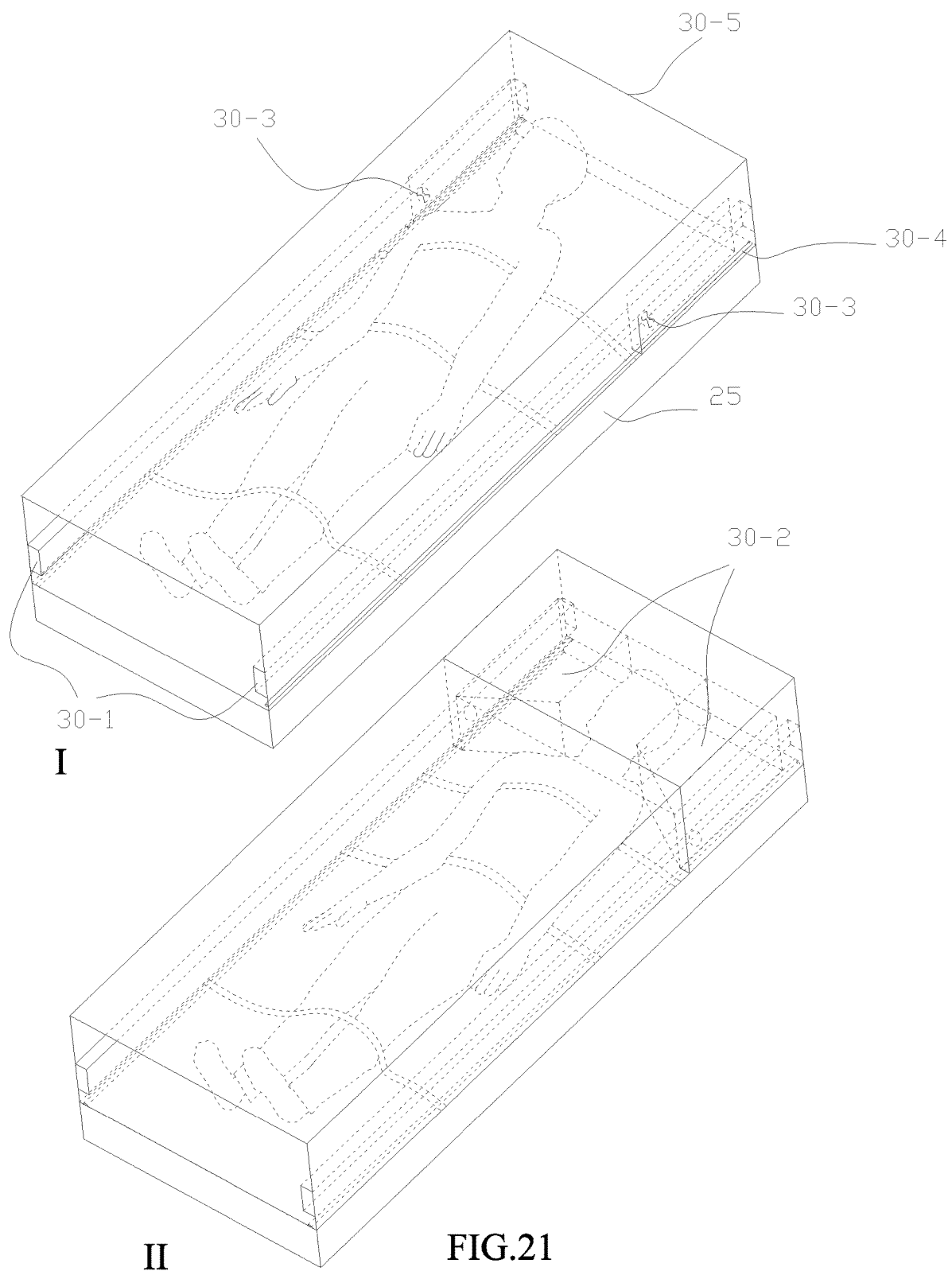
FIG. 21: Method of work of the berth sleeper airbag (covers head of passenger).
Figure 22:
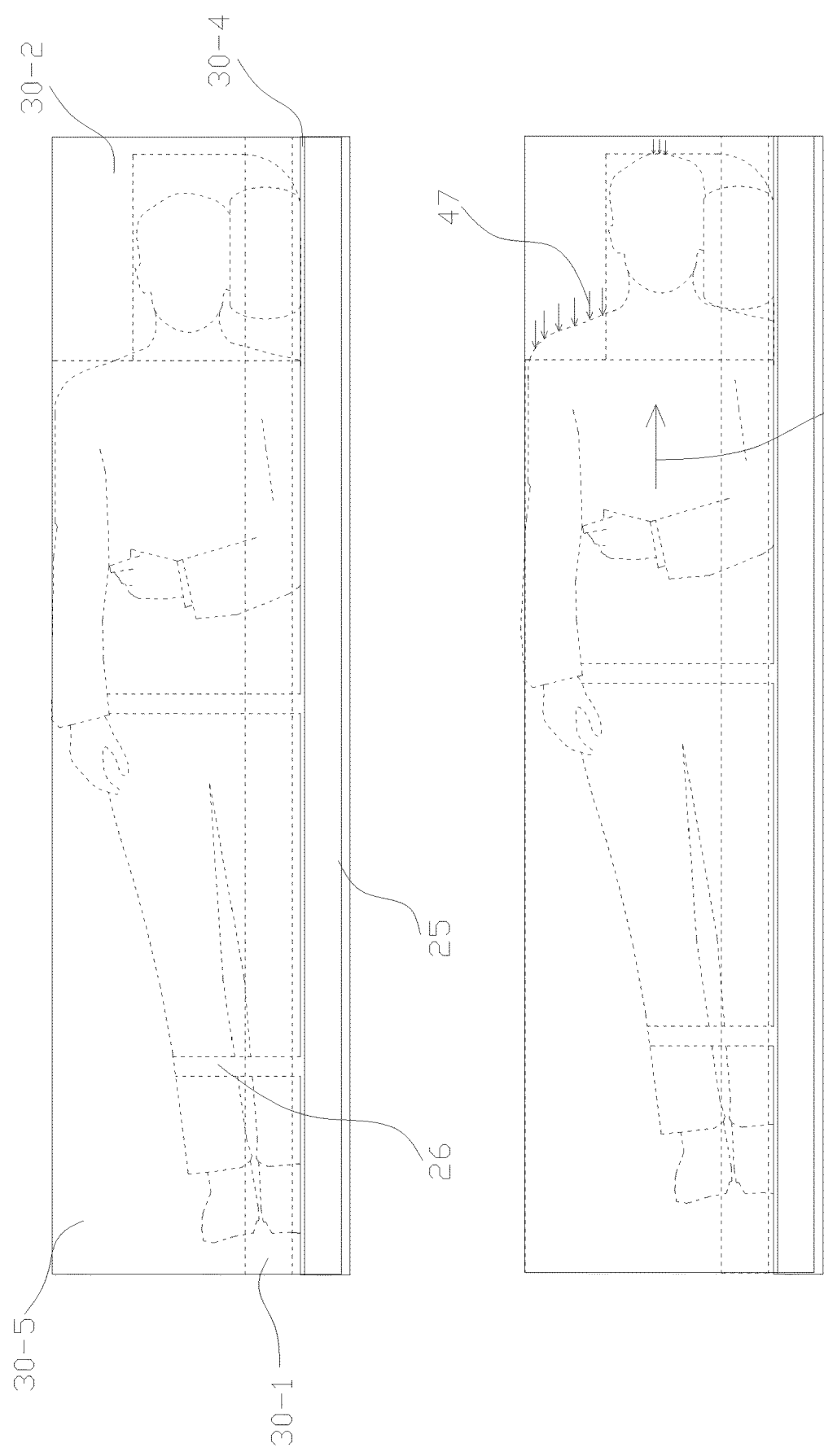
FIG. 22: Method of work of the berth sleeper airbag for passenger sleep in foetus, log and yearner position (covers all body of passenger).

According to the FIG. 1, each wagon is composed of a plurality of coupes and a gangway. Each coupe is composed of these major parts:
Side walls
Side wall of the wagon
Gangway side walls
Roof of the wagon
Ladder
Heating-cooling system
Seats or berth sleeper
Manual fire-smoke curtains
Airbags
Airbag inflation system
Gangway is composed of these major parts:
Fire-smoke detectors
Control unit
Automatic-manual fire-smoke curtains
Sliding windows
Air roof hatches along with an exhaust fans
That each part is explained on the following:
1) Side Walls:
   The side walls are made up of two metal plates, the gap between which is filled with fire-resistant materials such as rock wool or ceramic fiber. The jointing of the walls together or to the floor of the coupe is sealed by high temperature sealant tape so this layer prevents fuel leakage into the coupe.
2) Side Wall of the Wagon:
   This wall is common between coupes and wagon and does not absorb heat, and responds extremely well to fire. Beside it is soundproof it does not contribute to the development or the propagation of fire. This wall is made up of the materials resistant to high temperature and sound. It includes a window with a fire resistant glass and a manual fire-smoke curtain. Experts designed the wall with no common glass between the coupes, and the gap between the glass and the side walls does not allow the fire to transmit through the window to the side coupe.
3) Gangway Side Walls:
   The side wall of the gangway consists of two fixed parts with some windows and a sliding door. The wall of the gangway of the coupe, like its side walls, has been made of two metal plates filled with refractory materials such as rock wool or fiber ceramics.
   Also, wagons are equipped with fire resistant glass and given that the glass can be crushed due to accidents, behind the windows there are manual fire-smoke curtains or Sliding metal sheet. Passenger can close it immediately that prevents fire and smoke from entering to the coupe (FIG. 5 and FIG. 6).
   The outer surface of the side wall of the gangway is covered with intumescent coatings. It reduces the heat transfer rate to the coupe during fire. In crashes due to impact or overturning of the walls, there may be a gap between the walls of the coupe and the bottom. A flexible fire and fuel barrier tape is used to prevent fire and smoke from entering the coupe.
   To prevent smoke from entering from the sliding door, flexible intumescent tapes are used, which swells during a fire and fills the gap between the door and the span and prevents the smoke from entering the coupe. In order to prevent fuel penetration from the entrance door, the rail of the sliding door with a height of 30 mm is designed as shown in FIG. 3, as well as flexible intumescent tapes.
4) Roof of the Wagon:
   The roof is coated with a layer of soft, high temperature resistant, soundproofed or airbag materials that could cause less damage to the passenger in the event of overturning of the train and collision of the passenger with the roof of the coupe.
5) Ladder:
   Ladders are used for passenger climbing for second or third floor beds. Also, during an accident, passenger can break the window and by the ladder get off from the coupe (FIG. 13).
6) Cooling-Heating Ventilation System:
   Cooling/heating ventilation system in each coupe is independent of other coupes or gangways, so during fire smoke from other coupes or gangways does not penetrate the coupe.
7) Berth Sleeper:
   The material used in the berth sleeper is resistant to high temperature. Berth sleeper airbags are designed to protect the passenger's head and body while the passenger is asleep in the berth sleeper, which inflates in the event of a rollover accident. These airbags are multi-stages. In the first stage, the airbag inflates along the berth sleeper and covers the head or the whole body of the passenger (FIG. 9I). In order to bear the passenger weight during a head on collision accident the safety belt is used as support for first stage or the airbag inflates along the guide rails and the guide rails used as support. In the second stage, the guiding airbag inflates to take the passenger's head in the middle of the airbag (FIG. 9II). In this type of airbag, when the wagon is tilted, the passenger's weight load is applied to the shoulders of the passenger and a lesser force is applied to the neck and head of him/her (FIG. 10 and FIG. 11). This airbag along with berth sleeper can protect the passenger's head against the impact applied from left, right, front, back and up.
   The other type of the berth sleeper airbag (FIG. 21 and FIG. 22) is multi-stages. In the first stage, the first stage airbags inflate along the guide rails and cause the bag covers the whole body of the passenger (FIG. 21 I). The size of the bag is such that the passenger will not hit the upper bed if the belts are not fastened. In the second stage, the guiding airbag inflates to take the passenger's head in the middle of the airbag (FIG. 21 II). In this type of airbag, when the wagon is tilted, the passenger's weight load is applied to the shoulders of the passenger and a lesser force is applied to the neck and head of him/her (FIG. 22).
   To save the passenger of severe injuries in heavy accidents, seat belts are installed on the bed in order to keep the passenger in place. Soft covers are also mounted on the side walls of the coupe and below the upper bed so that the passengers can receive less damage by creating a soft compartment around them in the case of overturning the wagon and passenger's collision with walls or under the upper bed. This berth sleeper airbag can be used in heavy truck sleeper cabs too.
8) Seat:
   In FIG. 15, an overview of the wagon is shown with the seat arrangement. These seats are capable to move along the slider rails (FIG. 16). Seat airbags are designed to protect head and upper limb of the passenger while sitting on the seat. These airbags are embedded on the side wall of the cabin or on the edge of the seat back or on the luggage rack. These airbags are multi-stages. Each type of seat airbag is explained on the following:

Airbags Embedded on the Side Wall of the Cabin or on the Edge of the Seat Back:

in the first stage, the support airbag inflates (FIG. 17 II) and in the second stage, the guiding airbag inflates and covers the head and upper limb of the passenger (FIG. 17 III), and also this airbag along with seat back protects the passenger's head and upper limb against the impact applied from left, right, front, back and up.

Figure 20:
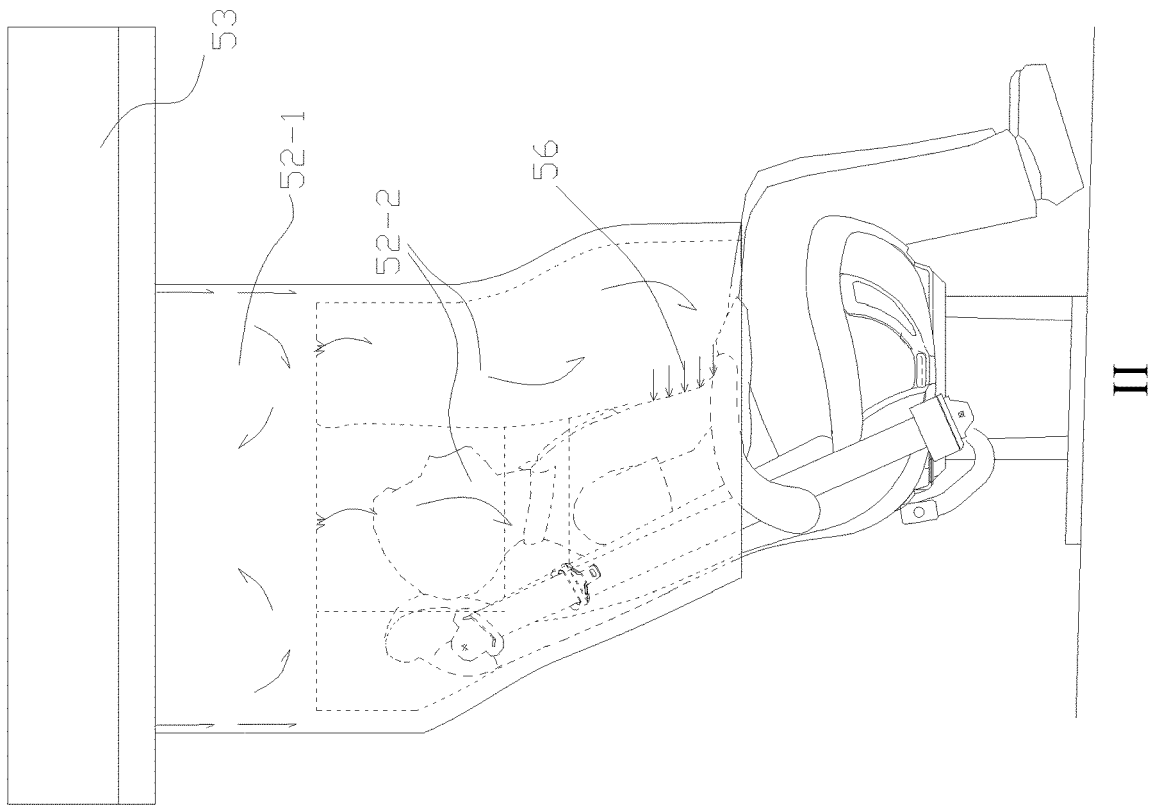
FIG. 20: Method of work of the seat airbag embedded on the luggage rack and passenger seated on the seat in side view.
Figure 20:
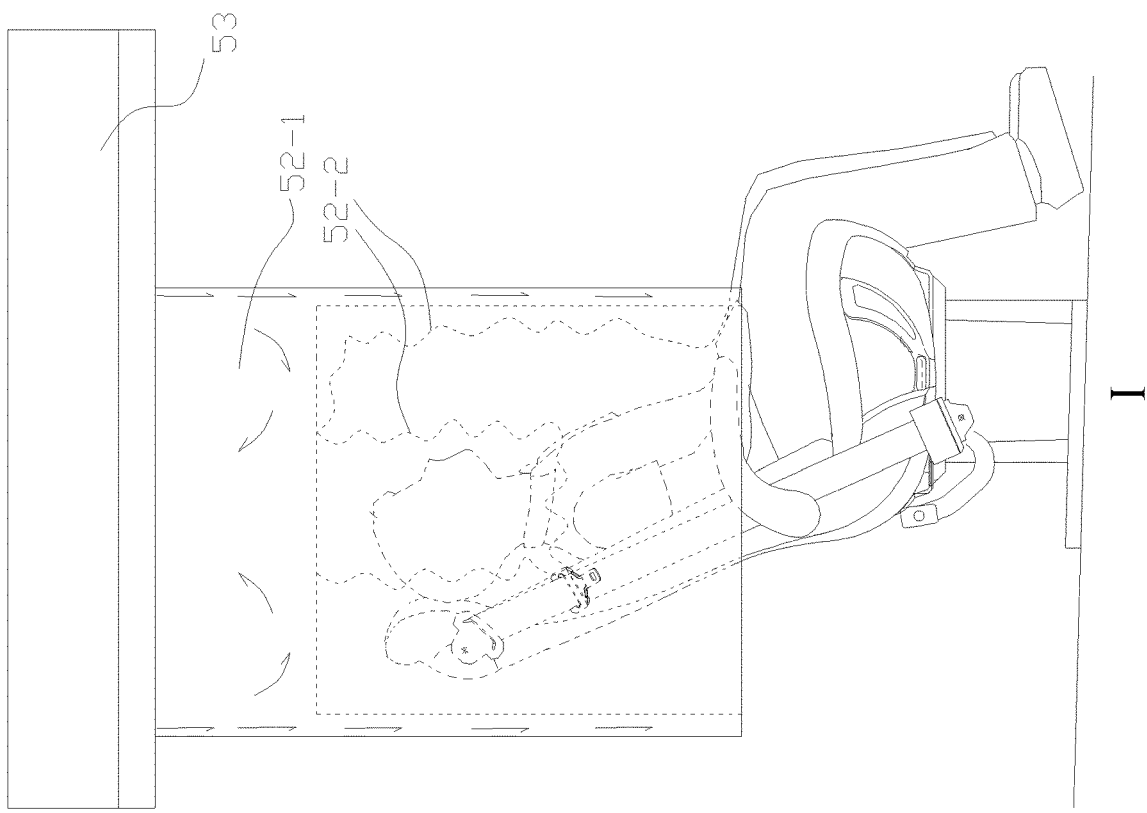

Airbags Embedded on the Luggage Rack:

At the time of the accident, the first stage airbag inflates from up to down and fully cover the upper limb of passenger and the seat back (FIG. 20 I) then the second stage airbags inflate and lead the passenger to good situation and keep the passenger in place (FIG. 20 II). At the time of the wagon is tilted, the second stage airbags apply forces to the shoulders of the passenger and reduce the intensity of forces applied to the head and neck of the passenger. This airbag along with seat back protects the passenger's head and upper limb against the impact applied from left, right, front, back and up.

Figure 19:
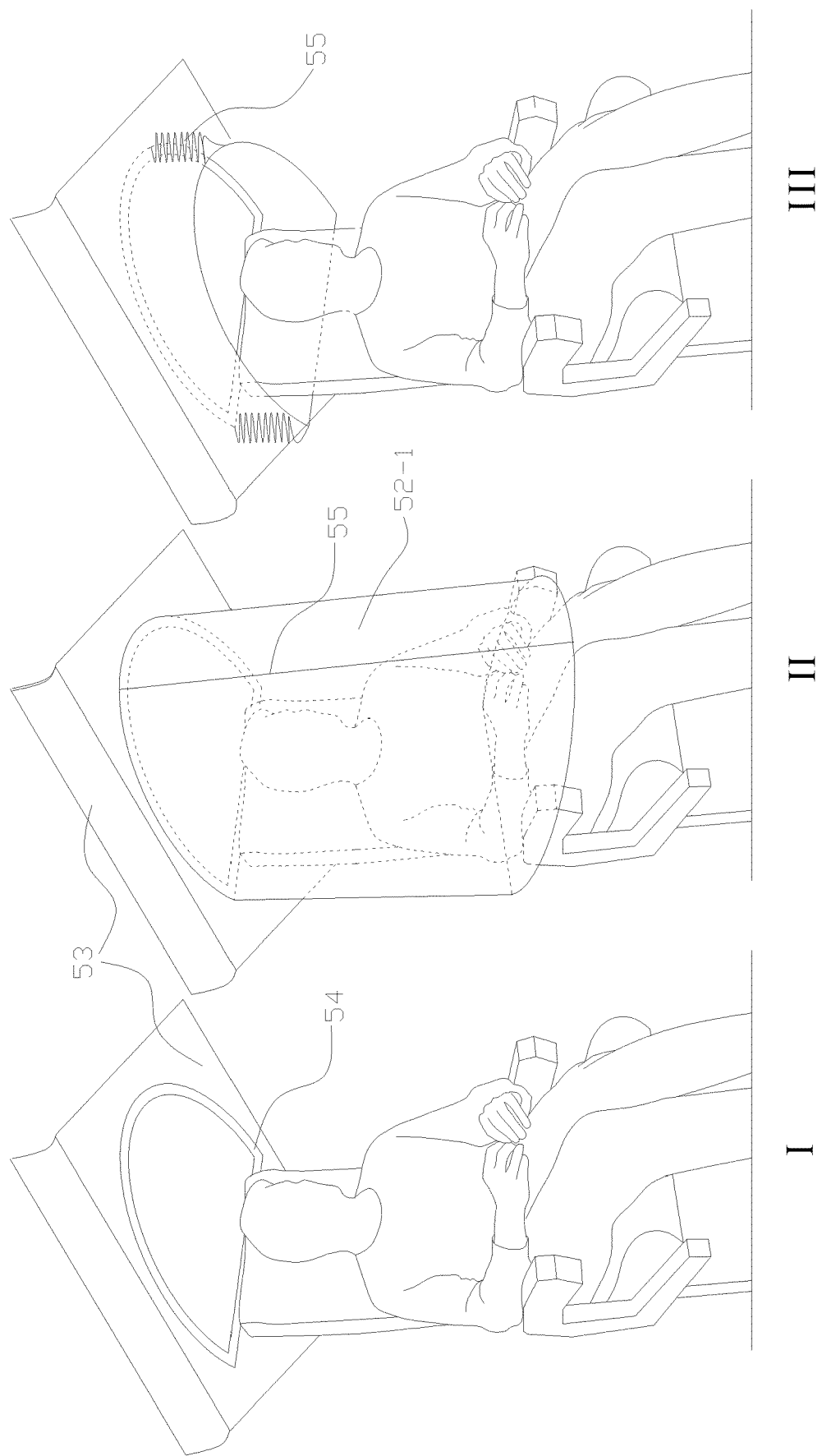
FIG. 19: Method of work of the seat airbag embedded on the luggage rack and passenger seated on the seat (covers the entire seat back).

As the airbags inflate, the gas in the airbags, escapes in a controlled manner through small vent holes then the rubber bands retract the airbags (FIG. 19 III).

According to FIG. 20 II, when the second stage airbags inflate, apply forces to abdomen of the passenger and keep the passenger in place even if the passenger forget to wear a seat belt. This type of airbag can be used for driver and passenger seats in different vehicles such as car, bus, trailer and etc.

In the following table, airbags specify that protect a part of body in different crash test.

10) The Gangway of the Wagon:

The gangway is the most important route for the passengers to escape at the time of the incident. The gangway contains fire-smoke curtains and fire-smoke detector, so that when the wagon is fired, smoke quickly does not spread into the gangway and allow passengers to leave the wagon through the gangway.

In the wall of wagon on the side of the gangway, there are embedded sliding window with fire resistant glass that is connected to the control unit, and when the fire is detected by the fire-smoke detector, the window opens, so that the smoke exit from the open window in a controlled manner and do not fill in the gangway. It can also be used to exhausts smoke from the gangway through roof hatch that embedded between the two fire-smoke curtains at the roof of the gangway and exhaust the air in the gangway to outside the wagon (in addition to exhaust the air in the gangway in the normal state, it also takes command from the control unit). Wires and cables used in this wagon are resistant to heat and mechanical shock, and fireproof electrical ducts have been used.

Methods of opening curtains are:

Drop opening method: In this way with the command of the control unit, the power is removed from the roller motor then gravity acting on the bottom bar weight makes the curtain drop. This assumes that the curtain is a gravity drop type, which most curtains are actually are. This method is not suitable for cases where the wagon is overturned and the fire occurs.

Controlled opening method: In this way with the command of the control unit, the electromotor is turned on and by applying the electric motor force on the metal strip, the curtain is opened along the guide rails. This

| Airbag Type | Part of body | Frontal-impact crash test | Side impact crash test | 25% small overlap crash test | Rear offset impact crash test | Rollover crash test |
|---|---|---|---|---|---|---|
| seat airbag embedded on the side wall | Head of passenger with seat belt | 2th airbags | 2th airbags | 2th airbags | seat back | 2th airbags |
| | Neck of passenger with seat belt | 2th airbags | 2th airbags | 2th airbags | seat back | 2th airbags |
| | Upper limb passenger with seat belt | 2th airbags | 2th airbags | 2th airbags | seat back | 2th airbags |
| | Head of passenger without seat belt | 2th airbags | 2th airbags | 2th airbags | seat back | 2th airbags |
| | Neck of passenger without seat belt | 2th airbags | 2th airbags | 2th airbags | seat back | 2th airbags |
| | Upper limb passenger without seat belt | 2th airbags | 2th airbags | 2th airbags | seat back | 2th airbags |
| seat airbag embedded on the roof | Head of passenger with seat belt | 2th airbags | 2th airbags | 2th airbags | seat back | 2th airbags |
| | Neck of passenger with seat belt | 2th airbags | 2th airbags | 2th airbags | seat back | 2th airbags |
| | Upper limb passenger with seat belt | 2th airbags | 1th airbag | 2th airbags | seat back | 2th airbags |
| | Head of passenger without seat belt | 2th airbags | 2th airbags | 2th airbags | seat back | 2th airbags |
| | Neck of passenger without seat belt | 2th airbags | 2th airbags | 2th airbags | seat back | 2th airbags |
| | Upper limb passenger without seat belt | 2th airbags | 1th airbag | 2th airbags | seat back | 2th airbags |

9) Airbag Inflation System:

It's necessary to inflate second airbag after the first airbags inflated completely, to the berth sleeper airbag and seat airbag proper performance. These airbag inflation systems can be used:

An airbag inflation system for a unique airbag: the second airbags coupled to the first airbag and a plurality of rupture disc placed between the first and second airbags that fail within an optimal range of gas pressure in the first stage airbag then the second stage airbags inflate.

Multi airbag inflation system for some separate airbags: the second airbag is separate from the first airbag and a multistage airbag inflation system that with a short term delay, inflates the first and second airbags respectively.

The inflation of the airbags in the vehicle is controlled by a central airbag control unit.

method, in case of overturning of the wagon, has the ability to open the anti-fire curtain.

If the curtain is open and the wagon overturns, the magnet on the bottom bar will prevent the bar from sliding off the wagon's floor. Anti-smoke curtains are made of some pieces to allow passengers to cross the curtain. These curtains delay the spread of fire and smoke in the gangway, providing time and space for passengers to leave the wagon.

In FIGS. 15 and 16, general arrangement for wagon with berth sleeper and seat are showed. The target of this invention is to reduce the damages caused accident to the passengers, at the first phase. In the next phase, if the vehicle catches fire, with the increase in the incident time of smoke and fire spreading to the wagon, the passenger has plenty of time to react appropriately. At the time of the accident, passengers are not able to make appropriate decisions due to accidental shock, so the necessary training should be given to passengers to know how to react during and after an accident.

What is claimed is:

1. A device defining a berth sleeper airbag for a wagon containing a berth comprising:
   a bag;
   at least one first stage airbag coupled to the bag;
   at least one second stage airbag coupled to the bag timed to inflate after the first stage airbag inflates;
   a first and a second guide rail coupled to respective a first and a second berth sleeper side;
   wherein at the time of an accident or when the wagon is tilted, the at least one first stage airbag is capable of inflating along the guide rails and causes the bag to cover an entire the body of a passenger, after a pressure within the at least one first airbag reaches an optimal range of gas pressure the at least one second stage airbag inflates and fully covers a head of the passenger and also applies a force to a shoulders of the passenger and reduces an intensity of forces applied to the head and neck of the passenger while the passenger is asleep in the berth sleeper.

2. The device according to claim 1, the berth sleeper airbag further comprising:
   a plurality of rupture disc placed between the at least one first stage airbag and the at least one second stage airbag that fail within the optimal range of gas pressure in the at least one first stage airbag then the at least one second stage airbags inflate;
   wherein at the time of an accident or when the wagon is tilted, the at least one first stage airbag is capable of inflating along the guide rails and causes the bag to cover an entire the body of a passenger, the at least one second stage airbag inflates and fully covers a head of the passenger and also applies a force to a shoulders of the passenger and reduces an intensity of forces applied to the head and neck of the passenger while the passenger is asleep in the berth sleeper.

3. A device defining a berth sleeper airbag comprising at least one airbag system that is capable of inflating along a berth sleeper;
   Wherein the at least one airbag system comprises:
   a first stage airbag;
   a second stage airbag coupled to the first stage airbag timed to inflate after the first stage airbag;
   a plurality of rupture discs placed between the first stage airbag and the second stage airbags that rupture when a pressure within the first stage airbag reaches a predetermined pressure threshold causing the second stage airbag to inflate;
   wherein at the time of the accident or when a wagon which the berth sleeper is installed is tilted, the first stage airbag inflates along a length the berth sleeper and covers all of the body of a passenger, and then the second airbag inflates fully covering a head of the passenger and applying a force to a shoulders of the passenger to reduce an intensity of forces applied to the head and a neck of the passenger while the passenger is asleep in the berth sleeper.

* * * * *